(12) United States Patent
Shalaby

(10) Patent No.: US 12,448,302 B1
(45) Date of Patent: Oct. 21, 2025

(54) CONVERTER-FREE PV-POWERED WATER DESALINATION SYSTEM FOR REMOTE COMMUNITIES

(71) Applicant: IMAM MOHAMMAD IBN SAUD ISLAMIC UNIVERSITY, Riyadh (SA)

(72) Inventor: Mohamed Yehia Mohamed Shalaby, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/049,466

(22) Filed: Feb. 10, 2025

(51) Int. Cl.
| | |
|---|---|
| *C02F 1/14* | (2023.01) |
| *B01D 1/00* | (2006.01) |
| *B01D 5/00* | (2006.01) |
| *C02F 1/00* | (2023.01) |
| *C02F 1/04* | (2023.01) |

(Continued)

(52) U.S. Cl.
CPC .............. *C02F 1/14* (2013.01); *B01D 1/0035* (2013.01); *B01D 1/0082* (2013.01); *B01D 5/006* (2013.01); *C02F 1/008* (2013.01); *C02F 1/048* (2013.01); *F24S 10/17* (2018.05); *F24S 23/31* (2018.05); *H02J 3/32* (2013.01); *H02J 3/38* (2013.01); *H05B 1/0244* (2013.01); *C02F 2201/009* (2013.01); *C02F 2209/02* (2013.01); *H02J 2300/26* (2020.01); *H02S 99/00* (2013.01)

(58) Field of Classification Search
CPC .. C02F 1/008; C02F 1/14; C02F 1/048; F24S 10/17; F24S 23/31; B01D 1/0035; B01D 1/0082; B01D 5/006
See application file for complete search history.

(56) References Cited

U.S. PATENT DOCUMENTS

| | | | | |
|---|---|---|---|---|
| 4,194,949 A | * | 3/1980 | Stark ........................ | F24S 23/30 202/180 |
| 4,220,136 A | * | 9/1980 | Penney ................... | F24S 23/74 165/181 |

(Continued)

FOREIGN PATENT DOCUMENTS

FR            3 028 602 A1        5/2016

OTHER PUBLICATIONS

John Iskander, et al., "Water desalination using PV panels based on boiling and evaporation", Discover Water, vol. 4, Issue 3, Feb. 1, 2024, 12 pages.

*Primary Examiner* — Jonathan Miller
(74) *Attorney, Agent, or Firm* — Oblon, McClelland, Maier &Neustadt, L.L.P.

(57) ABSTRACT

A water heating system includes a photovoltaic (PV) panel configured to generate a direct current from sunlight, a light sensor configured to measure a real-time radiation intensity of the sunlight, and a water chamber configured to receive water. A reconfigurable heating circuit including one or more resistive heaters and switches is configured to heat water in the water chamber. A controller is configured to receive the real-time radiation intensity from the light sensor and adjust the switches in real time to match a total resistance of the reconfigurable heating circuit with $R_{Mppt}$ in real time at least before the water boils. $R_{Mppt}$ is a characteristic resistance of the PV panel at a Maximum Power Point for the real-time radiation intensity.

17 Claims, 11 Drawing Sheets

(51) Int. Cl.
  *F24S 10/17*    (2018.01)
  *F24S 23/30*    (2018.01)
  *H02J 3/32*     (2006.01)
  *H02J 3/38*     (2006.01)
  *H05B 1/02*     (2006.01)
  *H02S 99/00*    (2014.01)

(56) References Cited

U.S. PATENT DOCUMENTS

| | | | | |
|---|---|---|---|---|
| 4,933,046 A * | 6/1990 | May | ............... | B01D 1/0017 |
| | | | | 159/DIG. 42 |
| 5,293,447 A * | 3/1994 | Fanney | ............... | G05F 1/67 |
| | | | | 219/508 |
| 7,126,294 B2 * | 10/2006 | Minami | ............... | H02J 7/35 |
| | | | | 323/299 |
| 9,178,356 B2 * | 11/2015 | Bryson | ............... | G05B 15/02 |
| 9,278,315 B2 * | 3/2016 | Davis | ............... | B01D 1/0035 |
| 9,352,981 B2 * | 5/2016 | Simpson | ............... | B01D 5/006 |
| 9,702,586 B2 * | 7/2017 | Thomasson | ......... | F24H 9/2021 |
| 10,072,853 B2 * | 9/2018 | Chaudhry | ......... | F24D 19/1075 |
| 10,829,913 B1 * | 11/2020 | Ahmed | ............... | B01D 61/025 |
| 11,041,640 B2 * | 6/2021 | Stepa | ............... | F24H 15/407 |
| 12,000,599 B2 * | 6/2024 | Stepa | ............... | H02S 10/20 |
| 12,119,647 B2 * | 10/2024 | Tao | ............... | H02J 3/381 |
| 2010/0006140 A1 * | 1/2010 | Parker | ............... | F24S 23/30 |
| | | | | 136/246 |
| 2010/0083950 A1 * | 4/2010 | Bloxam | ............... | F24D 11/004 |
| | | | | 126/615 |
| 2013/0168224 A1 * | 7/2013 | Godshall | ......... | C02F 1/16 |
| | | | | 202/172 |
| 2014/0060100 A1 * | 3/2014 | Bryson | ............... | H02J 3/381 |
| | | | | 62/235.1 |
| 2014/0112647 A1 * | 4/2014 | Lichtenberger | ....... | F24H 9/1818 |
| | | | | 392/441 |
| 2014/0153913 A1 | 6/2014 | Newman et al. | | |
| 2014/0348493 A1 * | 11/2014 | Kreutzman | ......... | F24H 1/0018 |
| | | | | 392/441 |
| 2014/0360859 A1 * | 12/2014 | Faidi | ............... | B01D 1/0035 |
| | | | | 203/10 |
| 2015/0354833 A1 | 12/2015 | Kreutzman | | |
| 2016/0195284 A1 * | 7/2016 | Chaudhry | ......... | F24H 15/37 |
| | | | | 219/494 |
| 2018/0238563 A1 * | 8/2018 | Stepa | ............... | H02S 40/32 |
| 2018/0266701 A1 * | 9/2018 | Sofer | ............... | F24D 17/0063 |
| 2022/0010977 A1 * | 1/2022 | Stepa | ............... | H02J 3/381 |
| 2022/0170648 A1 * | 6/2022 | Hodges | ............... | F24H 15/152 |
| 2024/0113527 A1 * | 4/2024 | Ratz | ............... | H02J 3/381 |

* cited by examiner

CONVERTER-FREE PV-POWERED WATER DESALINATION SYSTEM FOR REMOTE COMMUNITIES

BACKGROUND

Technical Field

The present disclosure is directed generally to the field of renewable energy systems, and more particularly to photovoltaic-powered water heating and desalination systems. Specifically, the present disclosure relates to systems and methods for direct coupling of photovoltaic panels with resistive heating elements for water heating and desalination applications for converter-free operations.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Access to clean and affordable fresh water remains a critical challenge in many parts of the world, especially in isolated and off-grid communities. Traditional desalination systems typically rely on grid power or diesel generators, making them unsuitable for isolated communities without reliable access to conventional power sources. Fresh water scarcity, particularly in remote and coastal areas, has driven extensive research into sustainable water desalination technologies. Solar-powered desalination systems offer a sustainable solution to this issue by utilizing photovoltaic (PV) panels to drive water desalination processes. Solar-powered desalination systems, using renewable energy, offer an environmentally friendly alternative to conventional energy-intensive methods. These systems often integrate PV panels and solar thermal components to enhance energy efficiency and production capabilities.

Many research studies have integrated PV and thermal systems, but these systems still rely on power converters and advanced electronic controls, increasing their complexity. Some approaches focused on using batteries for energy storage, which introduces additional costs, environmental concerns, and maintenance requirements. Reverse Osmosis (RO) systems powered by solar panels are widely used but depend on intermediate converters for stable operation, which increases cost. These systems typically require complex power conditioning equipment, including DC-DC (direct current-direct current) converters and inverters, to optimize the power transfer from the PV panels to the desalination components. The power conditioning equipment adds significant cost, complexity, and potential points of failure to the system. Known solar desalination systems often employ Maximum Power Point Tracking (MPPT) controllers to optimize the power extraction from PV panels. While MPPT controllers enhance system efficiency, they represent additional complexity and cost. Furthermore, these controllers require regular maintenance and may fail under harsh environmental conditions typically encountered in remote installations.

Almaktoof et al. [Almaktoof, A. M., Raji, A. K., Kahn, M. T. E., & Ekhlat, M. A. (2015). *Batteryless PV desalination system for rural areas: A case study. Journal of Energy in Southern Africa*, 26(4), 29-37] demonstrated a battery-less PV desalination system for rural areas. The study highlighted the potential of direct PV-desalination integration, bypassing batteries and relying on PV panels to power reverse osmosis units. This approach reduces operational complexity and improves system longevity. Hybrid PV/Thermal (PV/T) systems have emerged as a promising solution to improve both electrical and thermal energy efficiency. Ghazy et al. [Ghazy, M., Ibrahim, E. M. M., Mohamed, A. S. A., & Askalany, A. A. (2022). *Experimental investigation of hybrid photovoltaic solar thermal collector (PV/T)-adsorption desalination system in hot weather conditions. Energy*, 254] explored the use of adsorption desalination systems to cool PV panels, thereby enhancing their performance. Their findings demonstrated an improvement in PV electrical efficiency and desalinated water production, showcasing the synergies between thermal and electrical energy utilization.

He et al. [He, W., Huang, G., & Markides, C. N. (2023). *Synergies and potential of hybrid solar photovoltaic-thermal desalination technologies. Desalination*] reviewed hybrid PV and thermal desalination technologies, emphasizing the potential of coupling solar electricity and heat. This integration not only boosts efficiency but also reduces costs, making it an attractive option for off-grid applications in developing regions. Some systems combining PV and thermal energy recovery, such as the photovoltaic-hydrophilic modified tubular desalination system, have demonstrated improved energy and exergy efficiencies. Wu et al. [Wu, S. Y., Zhong, Z. H., Xiao, L., & Chen, Z. L. (2021). *Performance analysis on a novel photovoltaic-hydrophilic modified tubular seawater desalination (PV-HMTSD) system. Desalination*, 499] highlighted that such systems effectively utilize PV waste heat to drive desalination, achieving significant fresh water yields and system efficiency improvements.

Humidification-dehumidification (HDH) systems also stand out in this context. Giwa et al. [Giwa, A., Fath, H., & Hasan, S. W. (2016). *Humidification-dehumidification desalination process driven by photovoltaic thermal energy recovery (PV-HDH). Desalination*, 377, 163-171] proposed an HDH desalination process powered by recovered PV thermal energy, achieving enhanced water production while reducing environmental impact compared to conventional PV-RO systems. Weifeng et al. [Weifeng, H., Yu, L., Haohao, A., Xuan, Z., Pengfei, S., & Dong, H. (2022). *Parametric analysis of humidification dehumidification desalination driven by photovoltaic/thermal (PV/T) system. Energy Conversion and Management*, 259] performed a parametric analysis of a humidification-dehumidification desalination system driven by a PV/thermal module. Their results underscored the economic viability of such systems under various solar radiation intensities, highlighting the importance of tuning thermodynamic parameters to improve freshwater production and system payback periods.

Similarly, Delgado-Torres et al. [Delgado-Torres, A. M., García-Rodríguez, L., & del Moral, M. J. (2020). *Preliminary assessment of innovative seawater reverse osmosis (SWRO) desalination powered by a hybrid solar photovoltaic (PV)-Tidal range energy system. Desalination*, 477] assessed the feasibility of combining tidal and solar PV energy for sea water desalination. Their hybrid system extended operational hours of reverse osmosis plants, demonstrating enhanced energy utilization and water production. Ahmed et al. [Ahmed, F. E., Hashaikeh, R., & Hilal, N. (2019). *Solar powered desalination—Technology, energy and future outlook. Desalination*] outlined challenges in integrating solar technologies with desalination, including the high initial costs and the need for efficient energy recovery devices. Advances in materials and system designs, particularly in hybrid configurations, are paving the way for more efficient and cost-effective solutions. Sultan & Efzan [Sultan, S. M., & Ervina Efzan, M. N. (2018). *Review on recent Photovoltaic/Thermal (PV/T) technology advances and applications. Solar Energy*] reviewed advancements in PV/thermal technology, noting the increasing adoption of integrated systems for various applications, including desalination. The study emphasized the need for further development to enhance overall efficiency and reduce costs.

U.S. Pat. No. 5,293,447A describes an apparatus for heating water using solar energy that includes a photovoltaic array and a water heater with a variable resistive load. The system employs a controller for varying load characteristics of the resistive elements in response to incident radiation intensity, utilizing discrete resistive elements in reconfigurable circuit configurations.

FR3028602A1 describes a hot water production system incorporating photovoltaic cells generating direct current supplied to individual resistors installed in electric hot water production tanks. The system includes control means and calculation means for determining required resistance, with control means attempting to match the overall resistance to the calculated value.

US20140153913A1 describes a solar photovoltaic water heating system including a photovoltaic solar panel array and a storage tank containing water to be heated by a resistance heating element. The system utilizes switching circuits controlled by a control system to select the load resistance for the direct current power source.

US20150354833A1 describes a water heating system including a heat pump powered by a photovoltaic solar panel array. The system incorporates a maximum power point tracking (MPPT) module and an electronic switching circuit with various switches for selectively completing or opening circuits between the PV arrays and the active loads.

Each of the aforementioned references suffers from one or more drawbacks hindering their adoption, such as complex power conditioning requirements, reliability concerns in harsh environments, high maintenance needs, limited efficiency under varying solar conditions, and cost barriers for remote applications. Particularly, none of the aforementioned references describe measuring real-time radiation intensity of sunlight in combination with a controller to adjust a plurality of switches in real time to match a total resistance of a reconfigurable heating circuit with the characteristic resistance of the PV panel at its Maximum Power Point, eliminating need of a power converter. Many existing systems require electronic components, such as power converters that are prone to failure, particularly in isolated locations where technical support is limited. Additionally, current solutions often struggle to maintain desirable performance across varying environmental conditions, leading to reduced efficiency and operational challenges. Accordingly, it is one object of the present disclosure to provide a water heating system and a method of water processing using the water heating system that addresses these limitations by providing a converter-free PV-powered desalination system that can be used for isolated communities while offering simplicity, efficiency, and affordability.

SUMMARY

In an exemplary embodiment, a water heating system includes a photovoltaic (PV) panel configured to generate a direct current from sunlight; a light sensor configured to measure a real-time radiation intensity of the sunlight; a water chamber configured to receive water; a reconfigurable heating circuit including one or more resistive heaters and a plurality of switches and configured to heat the water in the water chamber; and a controller configured to receive the real-time radiation intensity of the sunlight from the light sensor and adjust the plurality of switches in real time so as to match a total resistance of the reconfigurable heating circuit with $R_{Mppt}$ in real time at least before the water boils. $R_{Mppt}$ is a characteristic resistance of the PV panel at a Maximum Power Point (MPPT) at the real-time radiation intensity of the sunlight.

In some embodiments, the reconfigurable heating circuit includes four resistive heaters and nine switches, the controller is configured to adjust the total resistance of the reconfigurable heating circuit by individually turning on or off each of the nine switches to change the four resistive heaters from one connection state to another connection state, and connection states of the four resistive heaters include connection in series, connection in parallel, and selective disconnection. The water chamber has a conical top on which are disposed a plurality of Fresnel lenses disposed around a circumference of the conical top as a belt at a height of the conical top.

In some embodiments, the four resistive heaters include a first resistive heater, a second resistive heater, a third resistive heater, and a fourth resistive heater. The nine switches include a first switch, a second switch, a third switch, a fourth switch, a fifth switch, a sixth switch, a seventh switch, an eighth switch and a ninth switch. A first end of the first resistive heater is connected to a first end of the fourth switch, a first end of the fifth switch, and a first end of the sixth switch, a second end of the first resistive heater is connected to a first end of the first switch, a first end of the seventh switch, a first end of the eighth switch, and a first end of the ninth switch, a first end of the second resistive heater is connected to a second end of the first switch and a second end of the fourth switch, a second end of the second resistive heater is connected to a first end of the second switch and a second end of the seventh switch, a first end of the third resistive heater is connected to a second end of the second switch and a second end of the fifth switch, a second end of the third resistive heater is connected to a first end of the third switch and a second end of the eighth switch, a first end of the fourth resistive heater is connected to a second end of the third switch and a second end of the sixth switch, a second end of the fourth resistive heater is connected to ground, and a second end of the ninth switch is connected to ground.

In some embodiments, the one or more resistive heaters are positioned inside the water chamber and configured to be immersed in the water, the reconfigurable heating circuit further includes wiring structures and a switch board that is positioned outside the water chamber, and the plurality of switches are positioned on the switch board and connected to respective ends of the one or more resistive heaters via the wiring structures.

In some embodiments, the one or more resistive heaters are each coated with a thermally conductive and electrically insulating material.

In some embodiments, the water heating system further includes a temperature sensor positioned in the water chamber and configured to measure a real-time temperature of the water.

In some embodiments, the water heating system further includes a battery, wherein the controller is configured to receive the real-time temperature from the temperature sensor and, when the real-time temperature reaches a boiling temperature of the water, divide the direct current into a first portion to be stored in the battery and a second portion to be delivered to the reconfigurable heating circuit and match a combined total resistance of the battery and the reconfigurable heating circuit with $R_{Mppt}$.

In some embodiments, the PV panel is configured to supply the direct current directly to the reconfigurable heating circuit via no power converter.

In some embodiments, the water heating system includes no power converter.

In some embodiments, the controller is configured to: store total resistance values of the reconfigurable heating circuit corresponding to the plurality of switches each independently being on or off, choose one of the total resistance values that is the closet to $R_{Mppt}$ in real time, and adjust the plurality of switches corresponding to the one of the total resistance values.

In some embodiments, the water heating system further includes a water pump configured to be powered by the PV panel and deliver the water to the water chamber.

In some embodiments, the water heating system further includes a Fresnel lens configured to focus sun rays and provide heat for the water chamber.

In some embodiments, the reconfigurable heating circuit includes one resistive heater, six switches, a motor and a battery.

In some embodiments, the six switches include a first switch, a second switch, a third switch, a fourth switch, a fifth switch and a sixth switch. A first end of the one resistive heater is connected to a first end of the third switch and a first end of the fourth switch, a second end of the one resistive heater is connected to a first end of the first switch, a first end of the fifth switch, a first end of the sixth switch, a first end of the motor is connected to a second end of the first switch and a second end of the third switch, a second end of the motor is connected to a second end of the fifth switch and a first end of the second switch, a first end of the battery is connected to a second end of the second switch and a second end of the fourth switch, a second end of the battery is connected to ground, and a second end of the sixth switch is connected to ground.

In some embodiments, the water chamber is a desalination chamber, and the water is saline water.

In some embodiments, the water heating system further includes a condenser configured to receive water vapors from the water chamber and condense the water vapors.

In another exemplary embodiment, a method of water processing includes heating the water with the water heating system of preceding paragraphs.

In some embodiments, the method further includes generating the direct current from the sunlight with the PV panel; measuring the real-time radiation intensity of the sunlight; and adjusting the plurality of switches of the reconfigurable heating circuit in real time so as to match the total resistance of the reconfigurable heating circuit with $R_{Mppt}$ in real time at least before the water boils.

In some embodiments, the water is saline water, and the heating includes heating the saline water to at least a boiling point of the saline water to generate water vapors.

In some embodiments, the method further includes condensing the water vapors to generate fresh water.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings.

DETAILED DESCRIPTION

Figure 1:
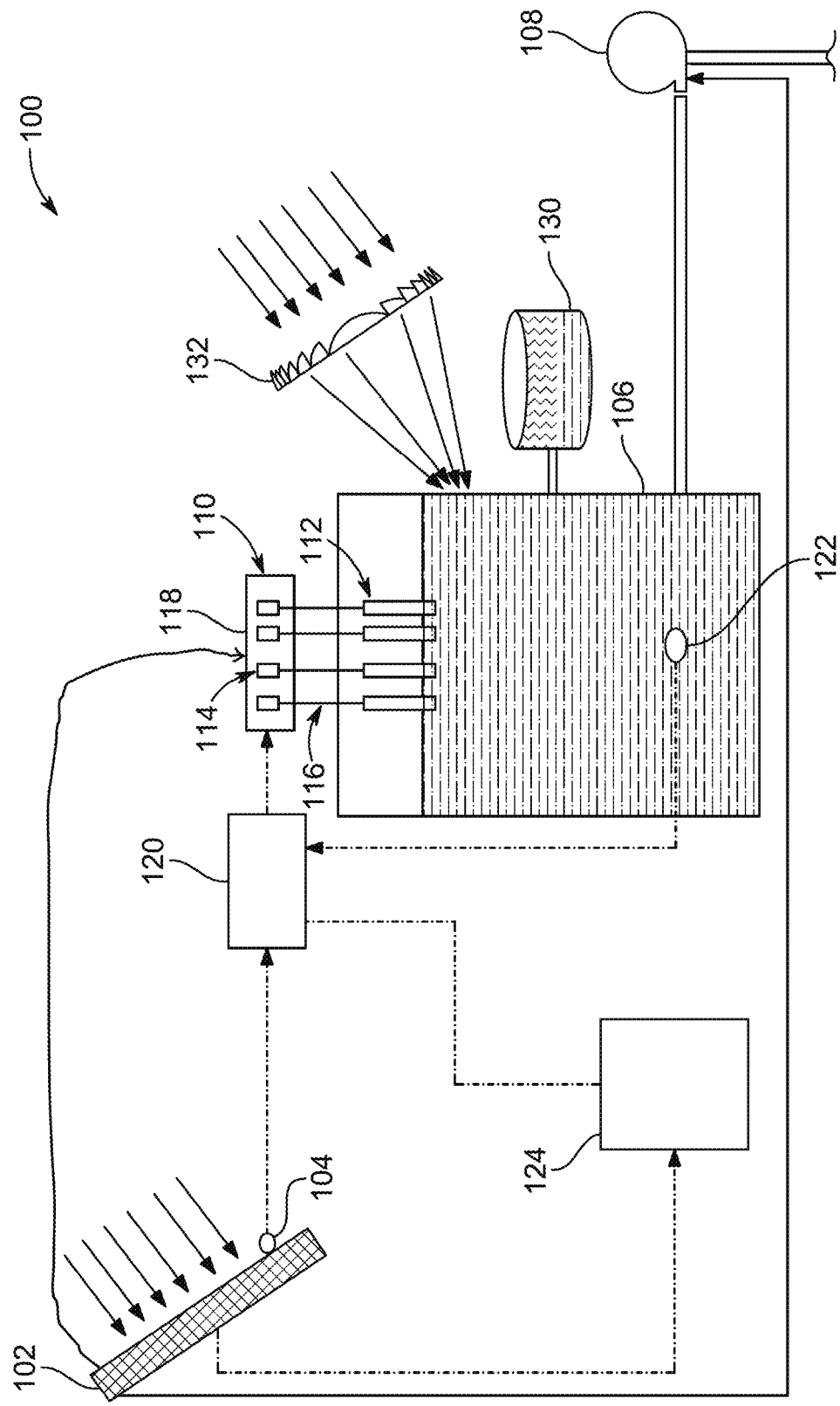
FIG. 1 is an exemplary schematic diagram of a water heating system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a water heating system and a method of water processing using the water heating system that harnesses solar energy, integrating direct current power generation with thermal processes in a manner that improves energy utilization while reducing system complexity. This integration enables efficient operation across varying environmental conditions without requiring complex intermediate power converters. The proposed system provides a solution for water heating and processing applications, particularly suitable for remote and off-grid locations where reliability and maintenance simplicity are crucial factors.

Referring to FIG. 1, illustrated is a schematic diagram of a water heating system (as represented by reference numeral 100) as per embodiments of the present disclosure. The water heating system 100 incorporates passive and active elements working in conjunction to improve energy utilization, ensuring consistent performance across varying environmental conditions. The water heating system 100 has a modular design which enables customization for various application requirements while maintaining core operational principles, making it adaptable to diverse geographical and operational contexts. The architecture of the water heating system 100 allows for scalable implementation across various applications, from individual household units to community-scale installations, while maintaining operational efficiency and cost-effectiveness. The water heating system 100 enables various applications, including domestic water heating, desalination, and industrial processes, and in particular serving remote and resource-limited environments.

As illustrated, the water heating system 100 includes a photovoltaic (PV) panel 102 configured to generate a direct current from sunlight. The photovoltaic panel 102 is positioned to receive incoming sunlight and convert solar energy into electrical energy. The photovoltaic panel 102 operates according to characteristic photovoltaic principles wherein the power output varies with operating conditions. The photovoltaic panel 102 exhibits a Maximum Power Point (MPP) during operation, at which point the photovoltaic panel 102 generates maximum available power for given sunlight conditions. At this Maximum Power Point, the photovoltaic panel 102 generally exhibits a characteristic resistance at Maximum Power Point ($R_{Mppt}$) that varies with solar radiation intensity and corresponds to the ratio of voltage to current at maximum power output conditions.

The water heating system 100 further includes a light sensor 104 configured to measure a real-time radiation intensity of the sunlight. The light sensor 104 is mounted in proximity to or on the photovoltaic panel 102 to detect incident solar radiation levels. The light sensor 104 generates measurement signals corresponding to instantaneous solar radiation intensity values detected at the location of the photovoltaic panel 102. These real-time measurements from the light sensor 104 enable determination of operating conditions for the photovoltaic panel 102, as the characteristic resistance $R_{Mppt}$ of the photovoltaic panel 102 varies with changes in solar radiation intensity. The light sensor 104 operates continuously during daylight hours to monitor variations in solar radiation intensity from morning through evening periods, enabling dynamic response to changing solar conditions.

The water heating system 100 further includes a water chamber 106 configured to receive water. In some examples, the water chamber 106 is in the form of an enclosure with internal volume sufficient to contain a quantity of water for processing. The water chamber 106 includes one or more inlet ports and one or more outlet ports to enable water flow into and out of the water chamber 106. It may be appreciated that the water chamber 106 is constructed to withstand operating temperatures required for water heating and includes thermal insulation to suppress heat loss to the surrounding environment.

The water heating system 100 can also include a water pump 108 configured to be powered by the photovoltaic panel 102 and deliver water to the water chamber 106. The water pump 108 may circulate water through a flow path within the water heating system 100, including delivering input water to the water chamber 106, circulating water for condensation processes (as discussed later in the description), and directing heated water for various applications. The water pump 108 operates in response to water level conditions within the water chamber 106, maintaining appropriate water levels for efficient operation of the water heating system 100. The flow rate of the water pump 108 varies in accordance with the power supplied by the photovoltaic panel 102, adjusted in response to available solar energy conditions.

The water heating system 100 further includes a reconfigurable heating circuit 110 including one or more resistive heaters 112 and a plurality of switches 114 and configured to heat the water in the water chamber 106. The reconfigurable heating circuit 110 receives the direct current from the photovoltaic panel 102 to power the one or more resistive heaters 112. The one or more resistive heaters 112 are arranged in an electrical configuration that can be modified through operation of the plurality of switches 114. The plurality of switches 114 enable the one or more resistive heaters 112 to be connected in various combinations to achieve different total resistance values for the reconfigurable heating circuit 110. Herein, the one or more resistive heaters 112 convert electrical energy from the photovoltaic panel 102 into thermal energy to heat the water contained within the water chamber 106. The plurality of switches 114 may be activated or deactivated to alter current paths through the one or more resistive heaters 112, thereby modifying the configuration of the reconfigurable heating circuit 110. Therefore the reconfigurable heating circuit 110 enables adjustment of the total resistance presented to the photovoltaic panel 102 through selective activation/deactivation of the plurality of switches 114.

The reconfigurable heating circuit 110 further includes wiring structures 116 and a switch board 118 that is positioned outside the water chamber 106. The switch board 118 provides a mounting surface for electrical components and maintains separation between switching elements and the water-containing portion of the water heating system 100. The plurality of switches 114 are positioned on the switch board 118 in an arrangement that facilitates connection to the one or more resistive heaters 112. The wiring structures 116 extend between the switch board 118 and the one or more resistive heaters 112, providing electrical connections from the plurality of switches 114 to respective ends of the one or more resistive heaters 112. The wiring structures 116 pass through penetrations in the water chamber 106 to maintain electrical continuity while preserving the watertight integrity of the water chamber 106. Herein, the plurality of switches 114 are positioned on the switch board 118 and connected to respective ends of the one or more resistive heaters 112 via the wiring structures 116. The mounting of the plurality of switches 114 on the switch board 118 enables access for control and maintenance operations while isolating the switching components from the water present within the water chamber 106.

In some embodiments, the one or more resistive heaters 112 are each coated with a thermally conductive and electrically insulating material. The coating material provides thermal conductivity to enable efficient heat transfer from the one or more resistive heaters 112 to water within the water chamber 106. The coating material also provides electrical insulation to prevent current flow between the one or more resistive heaters 112 and the surrounding water. The thermally conductive and electrically insulating coating maintains safe operation of the one or more resistive heaters 112 while immersed in water during operation of the water heating system 100.

In the example of FIG. 1, the one or more resistive heaters 112 are positioned inside the water chamber 106 and configured to be immersed in the water. As illustrated, the one or more resistive heaters 112 may be mounted through penetrations in the walls of the water chamber 106 to maintain direct contact with the water while preventing water leakage. The one or more resistive heaters 112 extend into the internal volume of the water chamber 106 at a depth sufficient to ensure complete immersion in the water during operation.

Note that the positioning of the one or more resistive heaters 112 are not particularly limited, provided that the one or more resistive heaters 112 can directly transfer thermal energy to the surrounding water. For instance, the one or more resistive heaters 112 can each independently be positioned at various locations of the water chamber 106 e.g. at a bottom of the water chamber 106, on a sidewall of the water chamber 106, at a lower part of the water chamber 106, at an upper part of the water chamber 106 (as shown in FIG. 1), etc. Preferably, the one or more resistive heaters 112 are positioned at the lower part of the water chamber 106. More preferably, the one or more resistive heaters 112 are positioned at the bottom of the water chamber 106. As a result, the one or more resistive heaters 112 can be mostly or fully immersed in water during operation.

The switch board 118 can be positioned outside the water chamber 106 e.g. on an exterior side surface of the water chamber 106, away from the water chamber 106, etc. The wiring structures 116 may go into the water chamber 106 through an upper part of the water chamber 106, preferably through a top surface of the water chamber 106. For instance, the top surface of the water chamber 106 may function as a removable lid with holes for the wiring structures 116 to go through. To avoid entanglement within the water chamber 106, the wiring structures 116 may be at least partially bundled with each other and at least partially attached to an interior side surface of the water chamber 106 for example by pin or clamp structures. The wiring structures 116 can each be coated with a thermally insulating and electrically insulating material.

The water heating system 100 further includes a controller 120 configured to receive the real-time radiation intensity of the sunlight from the light sensor 104 and adjust the plurality of switches 114 in real time so as to match a total resistance of the reconfigurable heating circuit 110 with $R_{Mppt}$ in real time at least before the water boils. The controller 120 processes measurement signals from the light sensor 104 that indicate instantaneous solar radiation intensity levels incident on the photovoltaic panel 102. Based on these measurements, the controller 120 determines appropriate configurations for the plurality of switches 114 to achieve desired resistance values in the reconfigurable heating circuit 110.

At the aforementioned Maximum Power Point, the photovoltaic panel 102 presents a characteristic resistance $R_{Mppt}$ that represents the ratio of voltage to current under optimal power transfer conditions. This characteristic resistance $R_{Mppt}$ varies dynamically with changes in solar radiation intensity measured by the light sensor 104. The relationship between voltage and current at the Maximum Power Point defines $R_{Mppt}$, enabling the controller 120 to calculate the target resistance needed for optimal power transfer from the photovoltaic panel 102 to the reconfigurable heating circuit 110.

In some embodiments, the controller 120 stores different total resistance values achievable through various combinations of the plurality of switches 114. Upon determining the required $R_{Mppt}$ value based on real-time solar radiation measurements, the controller 120 selects and implements a switch configuration that produces a total resistance in the reconfigurable heating circuit 110 matching or closely approximating $R_{Mppt}$. For example, the controller 120 can store a set of total resistance values corresponding to all possible ON and OFF combinations of the plurality of switches 114, choose, from the set of total resistance values, a total resistance value that is the closest to $R_{Mppt}$, and adjust the plurality of switches 114 according to the chosen total resistance value. The controller 120 can execute these adjustments continuously during operation, modifying switch configurations as solar conditions change to maintain desirable power transfer from the photovoltaic panel 102.

The controller 120 performs these resistance matching operations throughout the heating cycle at least until the water in the water chamber 106 approaches boiling temperature. The matching of total resistance to $R_{Mppt}$ ensures maximum power transfer from the photovoltaic panel 102 to the one or more resistive heaters 112, following basic electrical principles wherein maximum power transfer occurs when source and load impedances are matched. This dynamic resistance matching enables the water heating system 100 to maintain efficient operation across varying solar conditions without requiring conventional power conversion equipment, as the reconfigurable heating circuit 110 adapts to match the electrical characteristics of the photovoltaic panel 102 directly and dynamically.

In some embodiments, the controller 120 is configured to store total resistance values of the reconfigurable heating circuit 110 corresponding to the plurality of switches 114 each independently being on or off. For this purpose, the controller 120 includes storage capability to maintain data representing total resistance values of the reconfigurable heating circuit 110. These stored values correspond to all possible combinations of switch states, in which each of the plurality of switches 114 can be independently set to an on state or an off state. The controller 120 may store a complete mapping between switch configurations and the resulting total resistance values produced by each configuration of the reconfigurable heating circuit 110.

The controller 120 is further configured to choose one of the total resistance values that is the closet to $R_{Mppt}$ in real time. The controller 120 implements a comparison function to evaluate the stored total resistance values against the calculated $R_{Mppt}$ value in real time. During operation, the controller 120 examines all available resistance values achievable through different switch configurations and determines which stored resistance value most closely matches the required $R_{Mppt}$ value. This determination may involve calculating the numerical difference between each stored resistance value and the target $R_{Mppt}$ to identify the configuration that minimizes this difference.

The controller 120 is further configured to adjust the plurality of switches 114 corresponding to the one of the total resistance values. That is, the controller 120 executes switch control operations based on the selected resistance value. Upon identifying the stored resistance value that is the closest to $R_{Mppt}$, the controller 120 retrieves the corresponding switch configuration data and generates control signals to adjust the plurality of switches 114. The controller 120 applies these control signals to individual switches within the plurality of switches 114, setting each switch to either an on state or an off state according to the stored configuration data. During operation, the controller 120 can dynamically establish the switch configuration that produces the total resistance value most closely matching $R_{Mppt}$ in the reconfigurable heating circuit 110.

In some embodiments, the PV panel 102 is configured to supply the direct current directly to the reconfigurable heating circuit 110 via no power converter. The PV panel 102 of the water heating system 100 connects directly to the reconfigurable heating circuit 110, establishing a direct electrical path for current flow. The direct current generated by the PV panel 102 flows to the one or more resistive heaters 112 through the wiring structures 116 without intermediate power conversion stages. This direct coupling between the PV panel 102 and the reconfigurable heating circuit 110 eliminates requirements for DC-DC (direct current-direct current) converters, inverters, or other power conditioning equipment that would otherwise modify voltage or current levels between the PV panel 102 and the load.

In some embodiments, the water heating system 100 includes no power converter. The water heating system 100 operates without incorporating any power conversion devices. The elimination of power converters extends throughout all subsystems of the water heating system 100, including power delivery to the water pump 108 and other electrical components. The water heating system 100 achieves desired power transfer and operational control through direct electrical connections and the reconfigurable heating circuit 110, rather than through electronic power conversion equipment. The direct electrical architecture of the water heating system 100 maintains consistent direct current characteristics from the PV panel 102 through to the end loads, with resistance matching handled through switch configurations rather than active power conversion.

In some embodiments, the water heating system 100 further includes a temperature sensor 122 positioned in the water chamber 106 to measure real-time temperature of the water. The temperature sensor 122 may be mounted through the penetration in the wall of the water chamber 106, extending into the water volume inside thereof. Herein, the controller 120 is configured to receive the real-time temperature from the temperature sensor 122. The temperature sensor 122 is configured to provide continuous temperature measurements to the controller 120 throughout operation of the water heating system 100, enabling monitoring of water temperature conditions within the water chamber 106.

In some embodiments, the water heating system 100 further includes a battery 124 configured to store electrical energy from the photovoltaic panel 102. When the temperature sensor 122 indicates to the controller 120 that the water temperature has reached boiling point, the controller 120 implements a power management strategy to prevent overheating while maintaining efficient use of available solar energy. Specifically, herein, when the real-time temperature reaches a boiling temperature of the water, the controller 120 is configured to divide the direct current into a first portion to be stored in the battery 124 and a second portion to be delivered to the reconfigurable heating circuit 110 and match a combined total resistance of the battery 124 and the reconfigurable heating circuit 110 with $R_{Mppt}$. That is, the controller 120 divides the direct current from the photovoltaic panel 102 into two portions through adjustment of the plurality of switches 114, with the first portion of the direct current flowing to the battery 124 for energy storage, while the second portion continues to flow to the reconfigurable heating circuit 110 to maintain water temperature.

The controller 120 can calculate a combined resistance value that accounts for both the battery 124 and the reconfigurable heating circuit 110 operating as parallel loads. The controller 120 adjusts the plurality of switches 114 to configure the reconfigurable heating circuit 110 such that the parallel combination of the battery 124 resistance and the reconfigurable heating circuit 110 resistance matches $R_{Mppt}$ of the PV panel 102. Through this configuration, the water heating system 100 maintains desirable power transfer from the PV panel 102 while preventing water overheating, generating a controlled amount of water vapors and storing excess energy in the battery 124 for later use.

In some implementations, the water chamber 106 is a desalination chamber, and the water is saline water. When configured for desalination operations, the water chamber 106 functions as the desalination chamber in which saline water is processed to generate water vapors for subsequent condensation into fresh water. In this implementation, the water chamber 106 receives saline water through the water pump 108 for thermal processing. The reconfigurable heating circuit 110 heats the saline water within the water chamber 106, causing the water to transition from liquid to vapor phase while leaving dissolved salts behind. The water chamber 106 includes features to accommodate salt accumulation and removal during desalination operations while maintaining efficient heat transfer to the saline water volume.

In some embodiments, the water heating system 100 further includes a condenser 130 configured to receive water vapors from the water chamber 106 and condense the water vapors. The condenser 130 receives the water vapors generated within the water chamber 106. The condenser 130 connects to the water chamber 106 through vapor transfer passages that direct steam flow from the heated chamber to the condensation surfaces. The condenser 130 provides cooling surfaces where water vapor contacts and transitions back to liquid phase, producing purified water. In some examples, the condenser 130 may incorporate flow channels that collect and direct the condensed purified liquid water to appropriate collection or storage vessels for subsequent use.

In some embodiments, the water heating system 100 further includes a Fresnel lens 132 configured to focus sun rays and provide heat for the water chamber 106. The water heating system 100 incorporates the Fresnel lens 132 positioned to concentrate sunlight onto the water chamber 106. The Fresnel lens 132 focuses incident solar radiation to provide additional thermal energy input to the water chamber 106, in addition to the heat generated by the reconfigurable heating circuit 110. The Fresnel lens 132 may be mounted in a fixed orientation relative to the water chamber 106 to maintain focused solar energy delivery during operation hours. The concentrated solar energy from the Fresnel lens 132 supplements the electrical heating from the one or more resistive heaters 112, enhancing the total thermal energy available for water processing within the water chamber 106.

In a preferably embodiment, a top of the water tank 106 is conical in form. The top may include a plurality of Fresnel lenses (e.g. 132) that extend around the circumference of the cone at a specific height to form a belt of Fresnel lenses each located on the circumference of the conical top.

Figure 2:
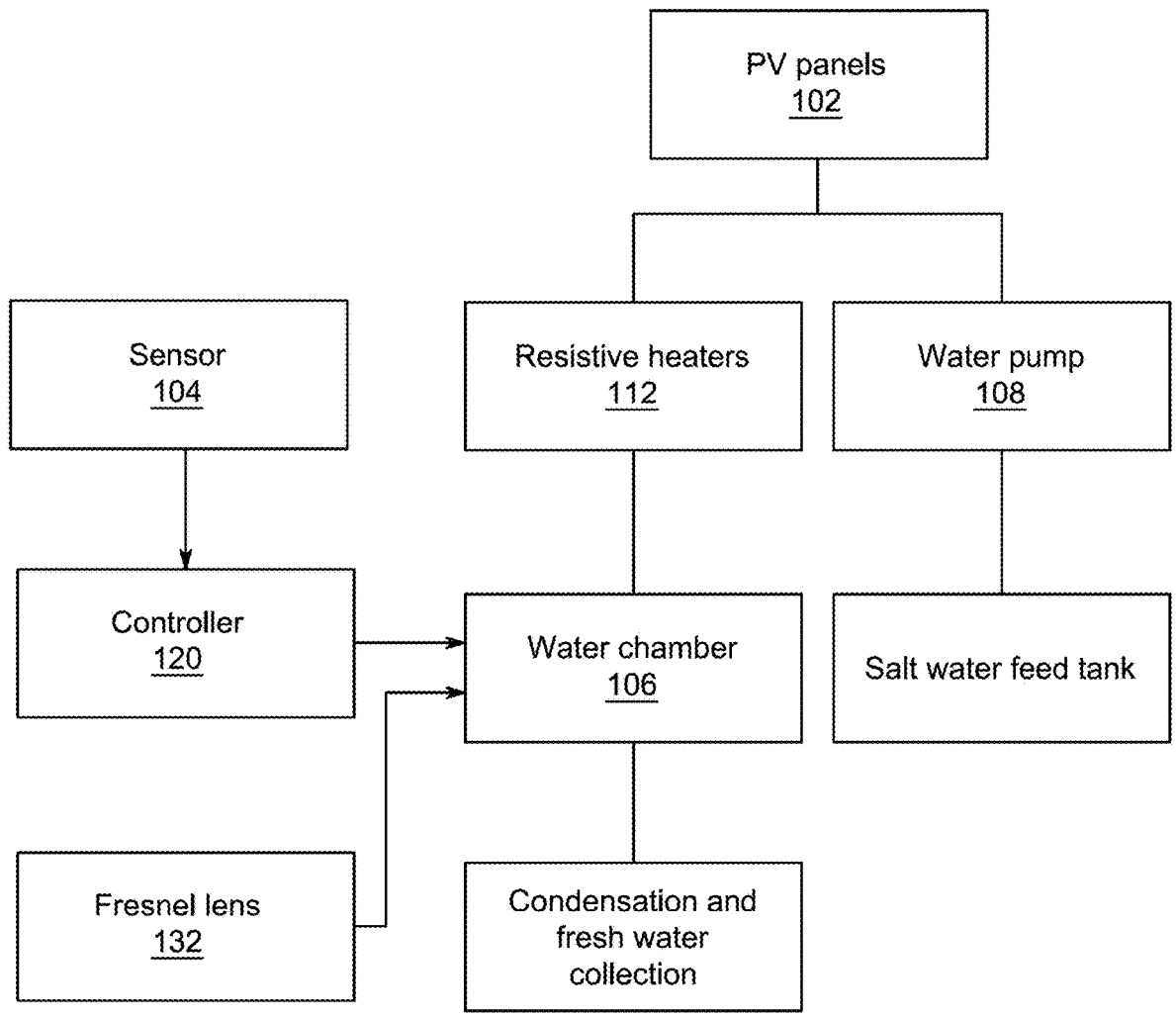
FIG. 2 is a diagram illustrating operational relationships between components of the water heating system, according to certain embodiments.

Referring now to FIG. 2, illustrated is a diagram depicting operational relationships between components of the water heating system 100. As shown, the photovoltaic panel 102 generates direct current that powers both the reconfigurable heating circuit 110 and the water pump 108. The direct current enables concurrent operation of water heating and circulation functions during the water heating system 100. The light sensor 104 provides real-time solar radiation measurements to the controller 120. Based on these measurements, the controller 120 determines and implements appropriate configurations for the plurality of switches 114 within the reconfigurable heating circuit 110. This control sequence maintains resistance matching between the reconfigurable heating circuit 110 and the water pump 108 and the $R_{Mppt}$ of the photovoltaic panel 102. Generally speaking, the photovoltaic panel 102 may provide electrical power for not only the reconfigurable heating circuit 110, but also other components such as the water pump 108. Accordingly, the controller 120 will match a total resistance of both the reconfigurable heating circuit 110 and the other components with $R_{Mppt}$ of the photovoltaic panel 102.

The water chamber 106 receives thermal energy from multiple sources within the water heating system 100. The one or more resistive heaters 112 deliver electrical heating through the reconfigurable heating circuit 110, while the Fresnel lens 132 contributes concentrated solar thermal energy. The water pump 108 draws water from a salt water feed tank and delivers the water to the water chamber 106 for thermal processing. The water heating system 100 processes water through sequential stages of heating and condensation. Water within the water chamber 106 transitions to vapor phase through combined thermal inputs from the reconfigurable heating circuit 110 and the Fresnel lens 132. The vapor flows to a condensation and fresh water collection unit where the vapor returns to liquid phase. This condensation and fresh water collection unit collects and stores the processed water output from the water heating system 100.

Therefore, it may be understood that the water heating system 100 integrates direct current power distribution, thermal energy generation, water circulation, and phase-change processes into a coordinated operation. The controller 120 manages the reconfigurable heating circuit 110 based on inputs from the light sensor 104, while the water pump 108 maintains water flow between the feed tank 160, the water chamber 106, and the condensation unit 162.

Figure 3:
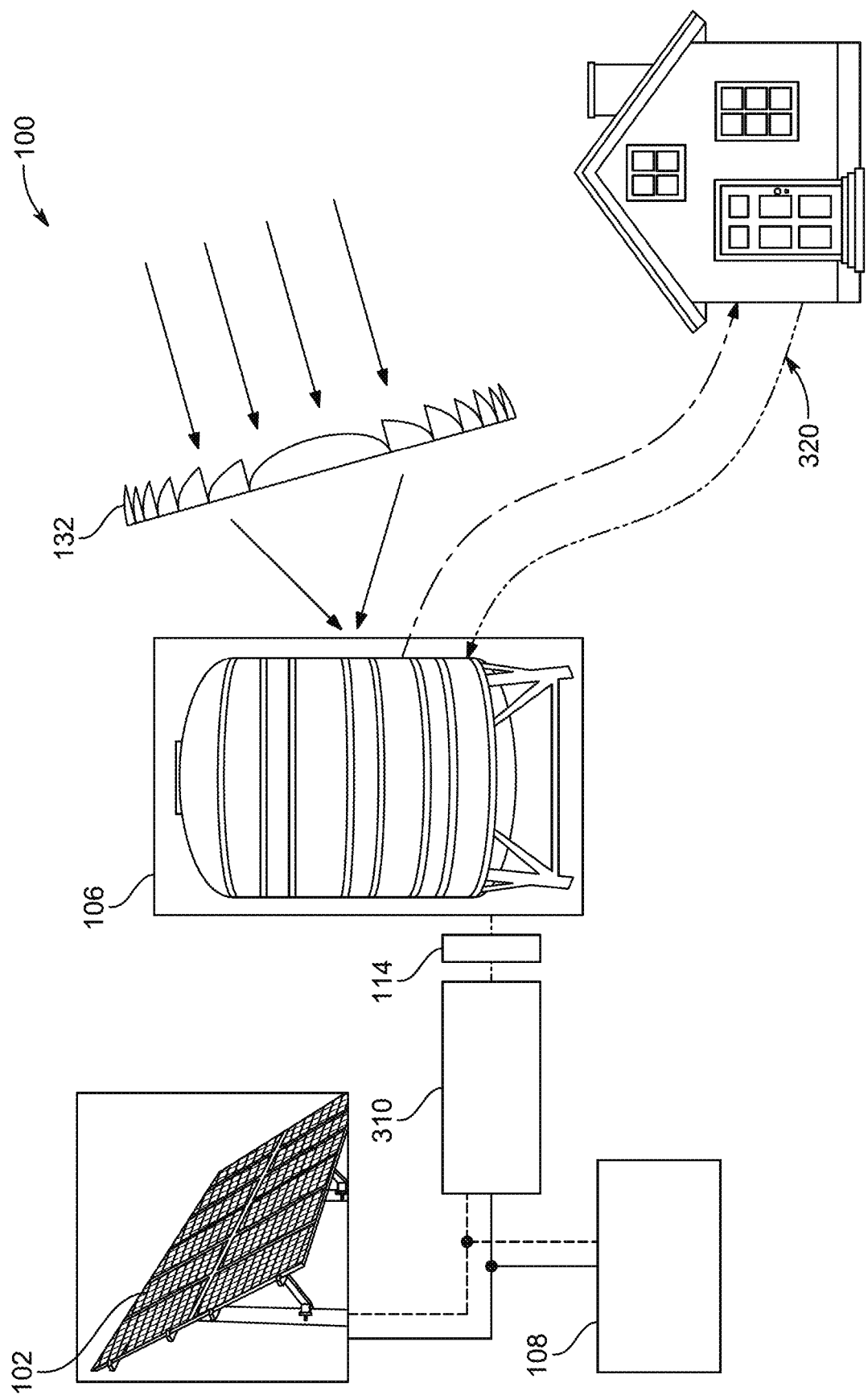
FIG. 3 is an exemplary schematic diagram illustrating implementation of the water heating system with residential integration, according to certain embodiments.

Referring now to FIG. 3, illustrated is an implementation of the water heating system 100 configured for dual-purpose operation providing both desalinated water and residential heating. The water heating system 100 includes the photovoltaic panel 102 mounted at an angle to receive incoming sunlight. The photovoltaic panel 102 connects to a load management unit 310 that incorporates the controller 120 and associated control circuitry for managing power distribution within the water heating system 100. The water heating system 100 also includes the water chamber 106, implemented as a desalination unit. The plurality of switches 114 are positioned to control the reconfigurable heating circuit 110 (not shown in FIG. 3) within the water chamber 106, with switch control signals provided by the load management unit 310.

Further, as illustrated, the water heating system 100 incorporates the water pump 108 with an integrated control circuit that manages water flow therethrough. The water pump 108 receives direct current from the photovoltaic panel 102 through connections managed by the load management unit 310. The water pump 108 coordinates with the controller 120 to maintain appropriate water levels and flow rates within the water chamber 106. The Fresnel lens 132 is mounted adjacent to the water chamber 106 in an orientation that focuses incident sun rays onto the outer surface of the water chamber 106. The focused solar energy provides supplementary heating to enhance the thermal processing capacity of the water heating system 100. The Fresnel lens 132 can include a series of stepped optical surfaces that concentrate solar radiation onto targeted areas of the water chamber 106.

Herein, the water heating system 100 is also configured to provide residential heating capability through a radiant heating system connection 320. The water chamber 106 includes outlet ports that direct heated water or vapor through distribution pathways to a residential structure. This integration enables the water heating system 100 to serve multiple functions, utilizing thermal energy generated within the water chamber 106 for both water processing and space heating applications.

The overall operation of the water heating system 100, as shown in FIG. 3, begins with direct current generation by the photovoltaic panel 102, which feeds into the load management unit 310. The load management unit 310 processes inputs from the light sensor 104 and temperature sensor 122 (not shown in FIG. 3) to determine target switch configurations for the plurality of switches 114. These switch control signals modify the configuration of the reconfigurable heating circuit 110 within the water chamber 106 to maintain maximum power transfer from the photovoltaic panel 102.

The water pump 108 circulates water through multiple flow paths within the water heating system 100. During desalination operations, saline water enters the water chamber 106 and passes through the water chamber 106. The reconfigurable heating circuit 110 provides electrical heating while the Fresnel lens 132 contributes additional solar thermal energy to drive the desalination process. The generated water vapors can be condensed for fresh water production or directed through the radiant heating system connection 320 to provide thermal comfort within the residential structure.

The load management unit 310 continuously monitors system conditions and adjusts operational parameters to improve performance. The control algorithms within the load management unit 310 balance multiple objectives including efficient power transfer from the photovoltaic panel 102, maintenance of desired water temperature levels, and distribution of thermal energy between water processing and residential heating functions. The water heating system 100 maintains these operations without power conversion equipment through direct coupling of the photovoltaic panel 102 to the operating loads and dynamic resistance matching via the plurality of switches 114.

Figure 4A:
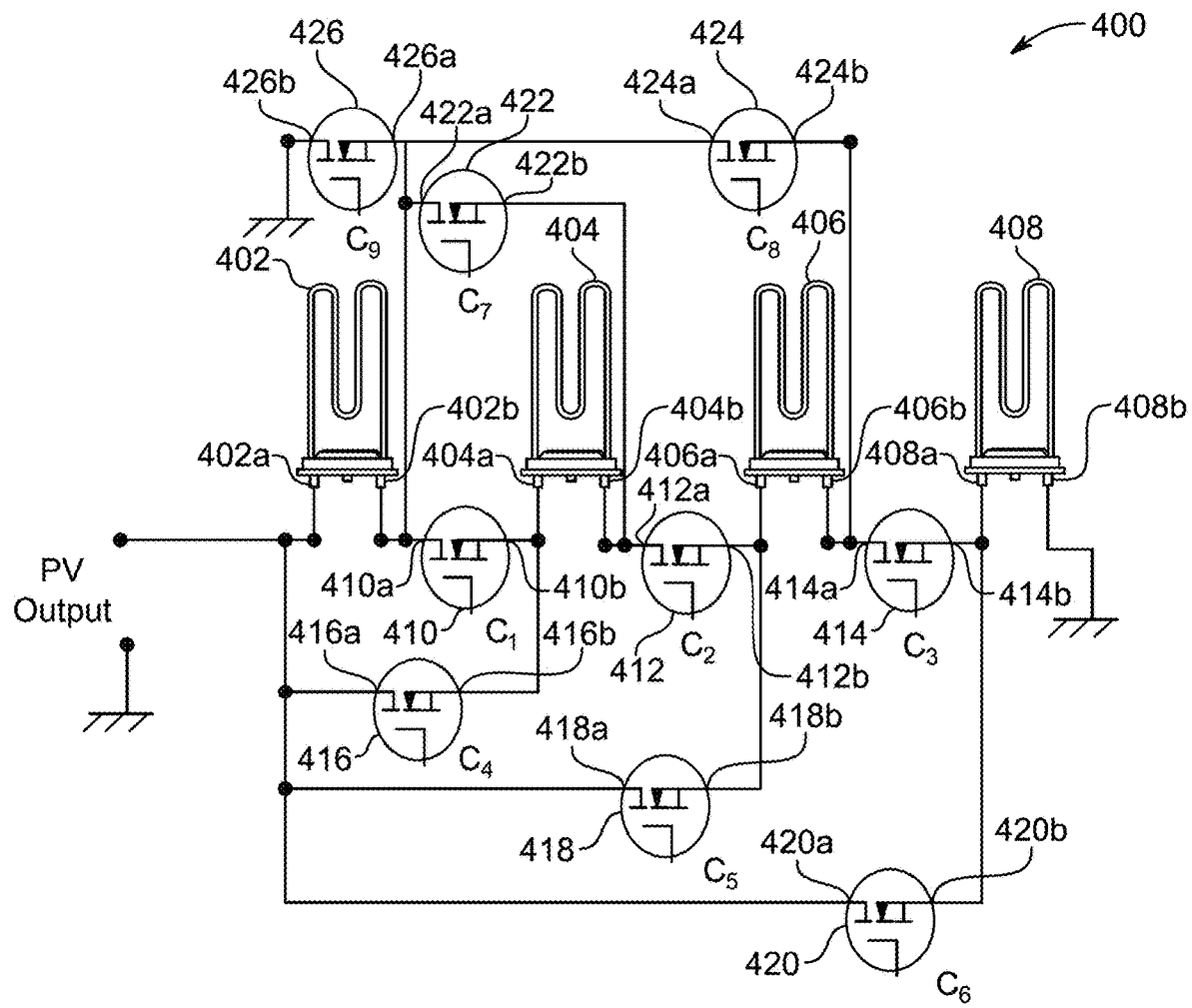
FIG. 4A is an exemplary circuit diagram illustrating a reconfigurable heating circuit having four resistive heaters and nine switches, according to certain embodiments.

Referring to FIG. 4A, illustrated is a circuit configurations of a reconfigurable heating circuit 400 of the water heating system 100, in accordance with one embodiment of the present disclosure. Herein, the reconfigurable heating circuit 400 shows one embodiment of the reconfigurable heating circuit 110 and includes four resistive heaters 402, 404, 406, 408 and nine switches 410, 412, 414, 416, 418, 420, 422, 424, 426. The four resistive heaters 402-408 of the reconfigurable heating circuit 400 are configured to receive direct current from the photovoltaic panel 102. The controller 120 is configured to adjust the total resistance of the reconfigurable heating circuit 400 by individually turning on or off each of the nine switches 410-426 to change the four resistive 402-408 heaters from one connection state to another connection state. That is, the controller 120 adjusts the total resistance of the reconfigurable heating circuit 400 by individually controlling the on/off state of each switch among the nine switches 410-426, enabling the four resistive heaters 402-408 to switch between different connection states.

The reconfigurable heating circuit 400 enables multiple connection states for the four resistive heaters 402-408. Herein, connection states of the four resistive heaters include connection in series, connection in parallel, and selective disconnection. In other words, these connection states include configurations where at least two of the resistive heaters connect in series, configurations where at least two of the resistive heaters connect in parallel, and configurations where certain resistive heaters are selectively disconnected from the circuit. The controller 120 selects among these connection states to achieve total resistance values that match $R_{Mppt}$ of the photovoltaic panel 102.

Herein, the four resistive heaters include a first resistive heater 402, a second resistive heater 404, a third resistive heater 406, and a fourth resistive heater 408. Further, the nine switches include a first switch 410, a second switch 412, a third switch 414, a fourth switch 416, a fifth switch 418, a sixth switch 420, a seventh switch 422, an eighth switch 424 and a ninth switch 426. As shown, a first end 402a of the first resistive heater 402 is connected to a first end 416a of the fourth switch 416, a first end 418a of the fifth switch 418, and a first end 420a of the sixth switch 420. A second end 402b of the first resistive heater 402 is connected to a first end 410a of the first switch 410, a first end 422a of the seventh switch 422, a first end 424a of the eighth switch 424, and a first end 426a of the ninth switch 426. A first end 404a of the second resistive heater 404 is connected to a second end 410b of the first switch 410 and a second end 416b of the fourth switch 416. A second end 404b of the second resistive heater 404 is connected to a first end 412a of the second switch 412 and a second end 422b of the seventh switch 422. A first end 406a of the third resistive heater 406 is connected to a second end 412b of the second switch 412 and a second end 418b of the fifth switch 418. A second end 406b of the third resistive heater 406 is connected to a first end 414a of the third switch 414 and a second end 424b of the eighth switch 424. A first end 408a of the fourth resistive heater 408 is connected to a second end 414b of the third switch 414 and a second end 420b of the sixth switch 420. Further, a second end 408b of the fourth resistive heater 408 is connected to ground. Additionally, the second end 426b of the ninth switch 426 is connected to ground.

The interconnection pattern of the nine switches 410-426 with the four resistive heaters 402-408 enables multiple current path configurations. When various combinations of the nine switches 410-426 are activated, current from the photovoltaic panel 102 flows through the resistive heaters 402-408 in various serial connection, parallel connection and selective disconnection combinations. The selective activation/deactivation of switches 410-426 can isolate individual resistive heaters 402-408 or combine them in different configurations to achieve desired total resistance values.

Figure 4B:
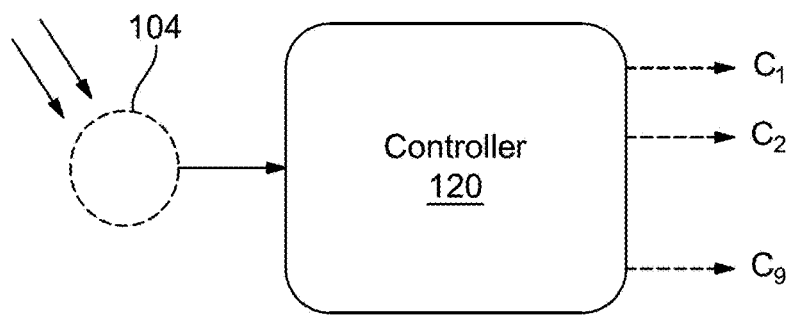
FIG. 4B is an exemplary control diagram illustrating generation of switching signals by a controller based on light sensor measurements for the circuit configuration of FIG. 4A, according to certain embodiments.

FIG. 4B illustrates a control arrangement for managing the nine switches 410-426 of the reconfigurable heating circuit 400. The light sensor 104 connects to the controller 120 to provide real-time solar radiation intensity measurements. The controller 120 processes these measurements to determine appropriate switch configurations for maintaining desirable power transfer from the photovoltaic panel 102.

Herein, the controller 120 generates nine independent switching signals C1 through C9, with each signal controlling one of the nine switches 410-426 in the reconfigurable heating circuit 400. Each switching signal determines the on/off state of its corresponding switch, enabling individual control of every switch in the reconfigurable heating circuit 400. The controller 120 determines the appropriate combination of switch states based on the solar radiation intensity measurements received from the light sensor 104. The controller 120 may implement control algorithms that translate solar intensity readings into specific switch configurations. When the light sensor 104 detects changes in solar radiation intensity, the controller 120 calculates the required $R_{Mppt}$ value and selects a switch configuration that produces a matching total resistance. The controller 120 then updates the switching signals C1-C9 to implement the selected configuration, modifying current paths through the four resistive heaters 402-408.

The proposed control arrangement for the water heating system 100 enables dynamic reconfiguration of the heating circuit in response to changing solar conditions. The controller 120 continuously monitors input from the light sensor 104 and adjusts the switching signals C1-C9 in real time. This continuous adaptation ensures that the total resistance of the reconfigurable heating circuit 400 remains matched to $R_{Mppt}$ of the photovoltaic panel 102 during operation of the water heating system 100.

Figure 5A:
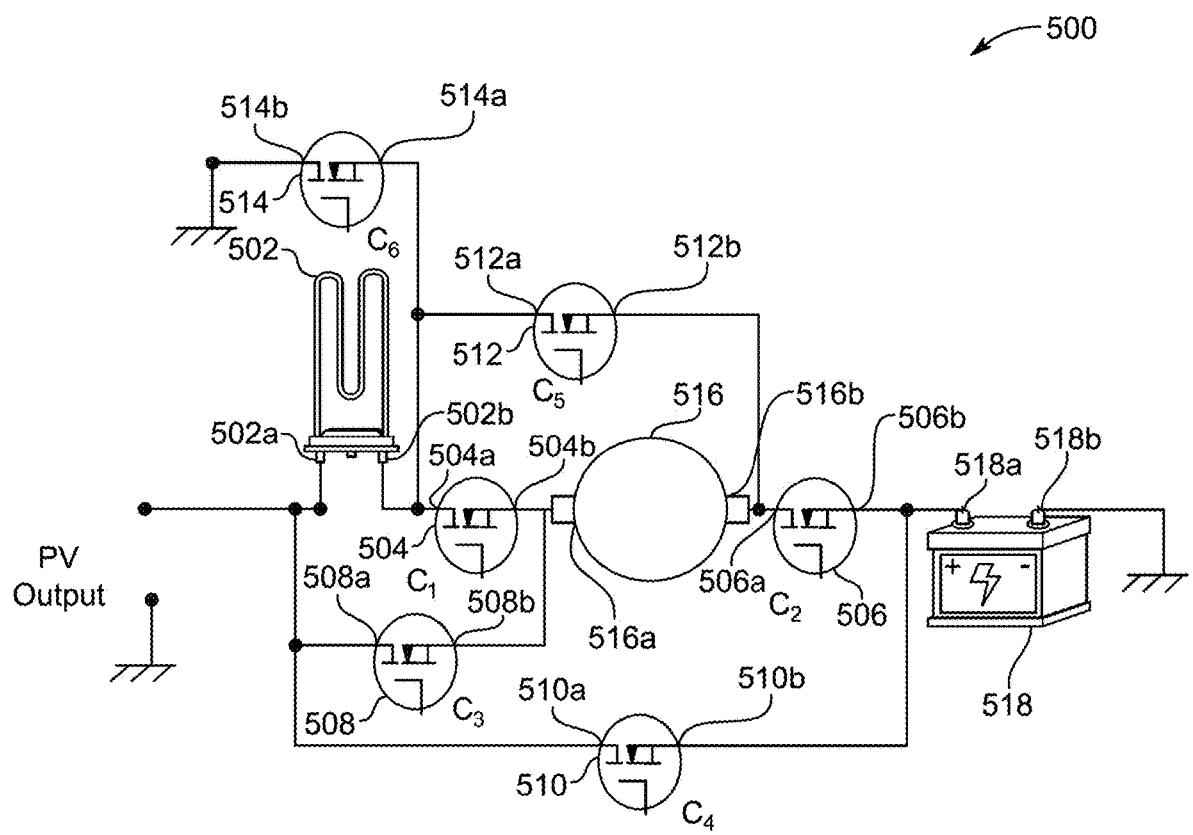
FIG. 5A is an exemplary circuit diagram illustrating a reconfigurable heating circuit having one resistive heater, six switches, a DC motor, and a battery, according to certain embodiments.

Referring to FIG. 5A, illustrated is a circuit configuration of a reconfigurable heating circuit 500 of the water heating system 100, in accordance with another embodiment of the present disclosure. The reconfigurable heating circuit 500 shows one embodiment of the reconfigurable heating circuit 110 and includes one resistive heater 502, six switches 504, 506, 508, 510, 512, 514, a DC motor 516, and a battery 518. In some examples, the reconfigurable heating circuit 500 is provided with the battery 518 for charge control and voltage conditioning. The reconfigurable heating circuit 500 is configured to receive direct current from the photovoltaic panel 102 and distribute the power among the multiple loads. Herein, the DC motor 516 may represent various motor-driven loads such as pumps or compressors, while the battery 518 provides energy storage capability. The resistive heater 502 operates in conjunction with these additional loads while maintaining desirable power transfer from the photovoltaic panel 102 (not shown) through appropriate switch configurations.

Herein, the six switches include a first switch 504, a second switch 506, a third switch 508, a fourth switch 510, a fifth switch 512 and a sixth switch 514. A first end 502a of the resistive heater 502 is connected to a first end 508a of the third switch 508 and a first end 510a of the fourth switch 510. A second end 502b of the resistive heater 502 is connected to a first end 504a of the first switch 504, a first end 512a of the fifth switch 512, and a first end 514a of the sixth switch 514. The DC motor 516 includes connections at both ends to enable various current paths through the reconfigurable heating circuit 500. A first end 516a of the DC motor 516 is connected to a second end 504b of the first switch 504 and a second end 508b of the third switch 508. A second end 516b of the DC motor 516 is connected to a second end 512b of the fifth switch 512 and a first end 506a of the second switch 506. Further, a first end 518a of the battery 518 is connected to a second end 506b of the second switch 506 and a second end 510b of the fourth switch 510. A second end 518b of the battery 518 is connected to ground. Additionally, a second end 514b of the sixth switch 514 is connected to ground.

The interconnection pattern of the six switches 504-514 with the resistive heater 502, the DC motor 516, and the battery 518 enables multiple current path configurations. When various combinations of the six switches 504-514 are activated, current from the photovoltaic panel 102 flows through the loads in various serial connection, parallel connection and selective disconnection combinations. The selective activation/deactivation of the switches 504-514 can direct power to individual loads or combine them in different configurations to achieve desired total resistance values. The arrangement of components in the reconfigurable heating circuit 500 enables flexible power distribution based on operational requirements.

Figure 5B:
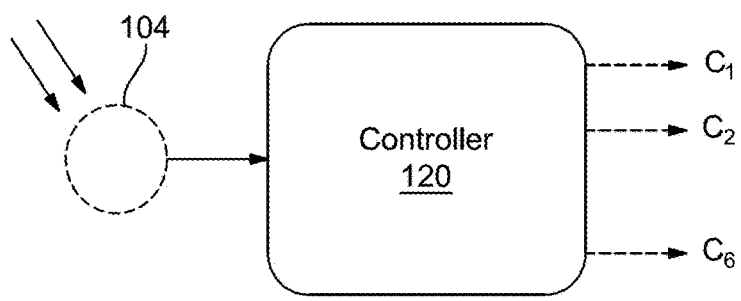
FIG. 5B is an exemplary control diagram illustrating generation of switching signals by a controller based on light sensor measurements for the circuit configuration of FIG. 5A, according to certain embodiments.

FIG. 5B illustrates a control arrangement for managing the six switches 504-514 of the reconfigurable heating circuit 500. The light sensor 104 connects to the controller 120 to provide real-time solar radiation intensity measurements. The controller 120 processes these measurements to determine appropriate switch configurations for maintaining desirable power transfer from the photovoltaic panel 102 while managing multiple loads. The controller 120 generates six independent switching signals C1 through C6, with each signal controlling one of the six switches 504-514 in the reconfigurable heating circuit 500. Each switching signal determines the on/off state of its corresponding switch, enabling individual control of every switch in the reconfigurable heating circuit 500. The controller 120 determines the appropriate combination of switch states based on the solar radiation intensity measurements received from the light sensor 104 and the operational requirements of each load. The control arrangement enables dynamic power distribution among the resistive heater 502, the DC motor 516, and the battery 518 in response to changing solar conditions.

The controller 120 continuously monitors input from the light sensor 104 and adjusts the switching signals C1-C6 in real time. This continuous adaptation ensures that the total resistance of the combined loads remains matched to $R_{Mppt}$ of the photovoltaic panel 102 during operation of the water heating system 100, while maintaining appropriate power distribution among the multiple loads based on operational priorities. Herein, the controller 120 may implement control algorithms that translate solar intensity readings into specific switch configurations while considering the status and requirements of each load. When the light sensor 104 detects changes in solar radiation intensity, the controller 120 calculates the required $R_{Mppt}$ value and selects a switch configuration that produces a matching total resistance while ensuring proper power delivery to each active load in the reconfigurable heating circuit 500.

The reconfigurable heating circuit 500 can be extended to multiple direct current loads in the water heating system 100. The configuration enables dynamic adjustment of total resistance to match $R_{Mppt}$ of the photovoltaic panel 102 under varying solar conditions. The plurality of switches 114 enables reconfiguration of load connections to maintain desirable power transfer from the photovoltaic panel 102. The loads in this configuration include the resistive heater 502, the DC motor 516, and the battery 518. The electrical resistance of the resistive heater 502 and DC motor 516 are measured and recorded prior to operation. The battery 518 exhibits resistance values that change with different charging states, requiring measurement and recording of resistance values across charging conditions. The battery 518 incorporates voltage conditioning and charge control circuitry to maintain stable operation.

The controller 120 manages the plurality of switches 114 to establish different load configurations. The loads can be connected in series connections, parallel connections, or selective deactivation states. The controller 120 adjusts these configurations to achieve total resistance values matching $R_{Mppt}$ of the photovoltaic panel 102. The switching configurations enable power distribution among multiple loads while maintaining maximum power transfer. Herein, the reconfigurable heating circuit 500 serves dual functions in the water heating system 100. The configuration maintains operation of the photovoltaic panel 102 at or close to Maximum Power Point across environmental variations through resistance matching. Additionally, the configuration enables directed power delivery to loads based on programmed priorities stored in the controller 120. The controller 120 implements these priorities through selective activation of the plurality of switches 114.

In general, the water heating system 100 connects the photovoltaic panel 102 directly to the water chamber 106 via no power converter for desalination operations. The direct current from the photovoltaic panel 102 flows to the reconfigurable heating circuit 110 which provides thermal energy for water processing in the water chamber 106. The controller 120 of the water heating system 100 manages power transfer through the plurality of switches 114. The controller 120 receives measurements from the light sensor 104 and adjusts configurations of the reconfigurable heating circuit 110 to maintain operation as solar conditions change. The controller 120 modifies connections between the resistive heaters to match the $R_{Mppt}$ of the photovoltaic panel 102. The water chamber 106 processes water through multiple heat transfer mechanisms. The reconfigurable heating circuit 110 provides electrical heating while the Fresnel lens 132 contributes additional thermal energy. This combined heating approach in the water chamber 106 increases the rate of water processing and improves energy utilization of the water heating system 100.

In the water heating system 100 of the present disclosure, the photovoltaic panel 102 generates a direct current with output characteristics that vary based on operating conditions. The power output of the photovoltaic panel 102 at any given solar radiation intensity depends on the operating point along a characteristic curve, where each point corresponds to a specific electrical resistance of the photovoltaic panel 102. The photovoltaic panel 102 exhibits a Maximum Power Point during operation where maximum power output occurs. At this Maximum Power Point, the photovoltaic panel 102 presents a characteristic resistance $R_{Mppt}$. The $R_{Mppt}$ value of the photovoltaic panel 102 changes with variations in solar radiation intensity measured by the light sensor 104. To achieve maximum power transfer from the photovoltaic panel 102, the total resistance of the reconfigurable heating circuit 110 must match $R_{Mppt}$.

The water heating system 100 connects the photovoltaic panel 102 directly to the reconfigurable heating circuit 110 without intermediate power converters. The reconfigurable heating circuit 110 adapts to match $R_{Mppt}$ through configurations controlled by the controller 120. The controller 120 and the plurality of switches 114 provide resistance matching capability without requiring power conversion components. The reconfigurable heating circuit 110 includes multiple resistive heaters 112 that can be connected in different configurations. The controller 120 receives measurements from the light sensor 104 indicating solar radiation intensity. Based on these measurements, the controller 120 generates control signals for the plurality of switches 114 to establish configurations of the resistive heaters 112 that match $R_{Mppt}$ of the photovoltaic panel 102.

The controller 120 implements switch control to reconfigure connections between series and parallel arrangements of the resistive heaters. The plurality of switches 114 activate or deactivate to modify current paths through the resistive heaters 112, establishing total resistance values that match $R_{Mppt}$ as solar conditions change. The water heating system 100 maintains desirable power transfer through direct resistance matching rather than power conversion equipment. The direct coupling with dynamic resistance matching provides reliable operation while reducing complexity in the water heating system 100. The water heating system 100 of the present disclosure achieves desirable power transfer through the light sensor 104, the controller 120, and the plurality of switches 114, with the proposed configuration requiring fewer components compared to systems using power converters.

The present disclosure further provides a method of water processing. The method of water processing using the water heating system 100. Various variants disclosed above, with respect to the aforementioned water heating system 100 apply mutatis mutandis to the present method.

The method of water processing using the water heating system 100 includes multiple operational steps and procedures. The photovoltaic panel 102 converts incoming solar radiation into direct current electrical power. This direct current flows to the reconfigurable heating circuit 110 including the one or more resistive heaters 112 positioned within the water chamber 106. The water pump 108 receives direct current from the photovoltaic panel 102 and delivers water to the water chamber 106. The water level in the water chamber 106 is monitored to maintain appropriate volume for processing. The light sensor 104 measures real-time solar radiation intensity and provides these measurements to the controller 120.

The controller 120 processes the solar radiation measurements to determine $R_{Mppt}$ of the photovoltaic panel 102. Based on the determined $R_{Mppt}$ value, the controller 120 configures the plurality of switches 114 to establish appropriate connections between the one or more resistive heaters 112. These configurations establish a total resistance in the reconfigurable heating circuit 110 that matches $R_{Mppt}$. The one or more resistive heaters 112 convert electrical energy from the photovoltaic panel 102 into thermal energy, heating the water within the water chamber 106. The Fresnel lens 132 focuses additional solar energy onto the water chamber 106, providing supplementary heating. The temperature sensor 122 monitors water temperature within the water chamber 106 and provides measurements to the controller 120.

When the water temperature approaches boiling point, the controller 120 may implement power management strategies through the plurality of switches 114. These strategies can include diverting portions of the direct current to the battery 124 while maintaining sufficient power for water heating. The processed water can be directed to various applications including fresh water production through condensation or thermal delivery for space heating.

In some embodiments, the method further includes generating the direct current from the sunlight with the PV panel 102. The photovoltaic panel 102 converts solar radiation into electrical energy that flows directly to the reconfigurable heating circuit 110 without intermediate power conversion equipment. The power output of the photovoltaic panel 102 varies with solar intensity according to characteristic photovoltaic behavior. The method also includes measuring the real-time radiation intensity of the sunlight. The light sensor 104 measures real-time radiation intensity of the sunlight incident on the photovoltaic panel 102. These measurements enable the controller 120 to determine the characteristic resistance $R_{Mppt}$ of the photovoltaic panel 102 at Maximum Power Point for any given solar condition. The controller 120 continuously monitors these radiation intensity measurements throughout operation of the water heating system 100. The method further includes adjusting the plurality of switches 114 of the reconfigurable heating circuit 110 in real time so as to match the total resistance of the reconfigurable heating circuit 110 with $R_{Mppt}$ in real time at least before the water boils. The controller 120 adjusts the plurality of switches 114 in real time based on the measured solar radiation intensity. These adjustments modify connections between the one or more resistive heaters 112 to establish total resistance values in the reconfigurable heating circuit 110. The controller 120 maintains these resistance values to match $R_{Mppt}$ of the photovoltaic panel 102 as solar conditions change, ensuring maximum power transfer until the water reaches boiling temperature.

In some embodiments, when the water is saline water, the heating includes heating the saline water to at least a boiling point of the saline water to generate water vapors. That is, when processing saline water, the water heating system 100 heats the saline water within the water chamber 106 to reach boiling temperature. The thermal energy from the reconfigurable heating circuit 110 and the Fresnel lens 132 causes the saline water to transition from liquid to vapor phase. The water vapor generation continues as thermal energy is supplied to the water chamber 106 through the combined heating mechanisms.

The method further includes condensing the water vapors to generate fresh water. The water vapor flows from the water chamber 106 to the condenser 130 where thermal energy is removed. The condenser 130 converts the water vapor back to liquid phase, producing fresh water output. The water pump 108 circulates cooling water through the condenser 130 to maintain condensation of the water vapor. The condensed fresh water collects for subsequent use in various applications.

A prototype of the water heating system 100 was developed and tested to demonstrate water heating capability. The prototype was tested using a photovoltaic panel 102 with specifications including maximum voltage of 36V, maximum current of 5.5 A, and maximum power output of 200 W. At maximum solar illumination occurring at solar noon, the characteristic resistance $R_{Mppt}$ of the photovoltaic panel 102 measured approximately 6.5 ohms, calculated as the ratio of maximum voltage to maximum current.

The reconfigurable heating circuit 110 was constructed using commercially available resistive heaters, each rated at 2000 W for 220V operation. The resistance of each individual resistive heater measured 24.2 ohms, calculated from the ratio of voltage squared to power rating. The prototype incorporated the photovoltaic panel 102, water chamber 106 with the reconfigurable heating circuit 110, water pump 108, and Fresnel lens 132 as described in reference to FIG. 1. It should be understood that various values associated with the prototype are described herein merely for illustrative purposes and are not limiting.

Testing procedures were implemented to evaluate temperature rise characteristics of the water heating system 100. The photovoltaic panel 102 was connected directly to the reconfigurable heating circuit 110, with four resistive heaters configured in parallel during noon testing conditions. A water volume of 5 liters was maintained in the water chamber 106, with testing conducted both with and without thermal insulation. Water temperature measurements were recorded at regular time intervals until thermal equilibrium was achieved.

The relationship between heat energy Q and temperature change was analyzed according to the equation (1) below:

$$Q = m\,C\Delta T \quad (1)$$

where Q is the heat energy (in joules, J) required to heat water, m is the mass of water (kg), C is the specific heat capacity of water (4200 J/(kg° C.)), ΔT is the temperature change ($T_{final} - T_{ini}$) in ° C.

Therefore the time required for heating is expressed as, $$t_{heating} = \frac{Q}{P} = \frac{mC\Delta T}{P} \quad (2)$$

where P is the power available from the PV source (200 W), and $t_{heating}$ is the heating time (in seconds). For the 5-liter water volume with initial temperature of 25° C., calculations indicated approximately 2.25 hours to reach boiling temperature.

After reaching boiling temperature, the energy from the photovoltaic panel 102 was utilized for water vaporization. The energy required for water evaporation was calculated using the equation:

$$Q_{evap} = m_{evap}\,L \quad (3)$$

where $Q_{evap}$ is the energy used for phase change (J), $m_{evap}$ is the mass of water evaporating (kg), and L is the latent heat of vaporization of water ($2.26 \times 10^6$ J/kg).

From this equation, after reaching boiling point, it was concluded that this simple system is capable of producing approximately 0.3 liters of water per hour through condensation. This output is sufficient for small-scale applications such as providing drinking water for an individual or meeting basic household needs in resource-limited environments. This system can be scaled up to produce more freshwater using more solar panels instead of only one panel which we used in our experiment. In principle, it was proved that this simple and low cost system is capable of providing freshwater by directly coupling PV output to the reconfigurable heaters to guarantee maximum power extraction from the PV source under different solar irradiance conditions.

Figure 6:
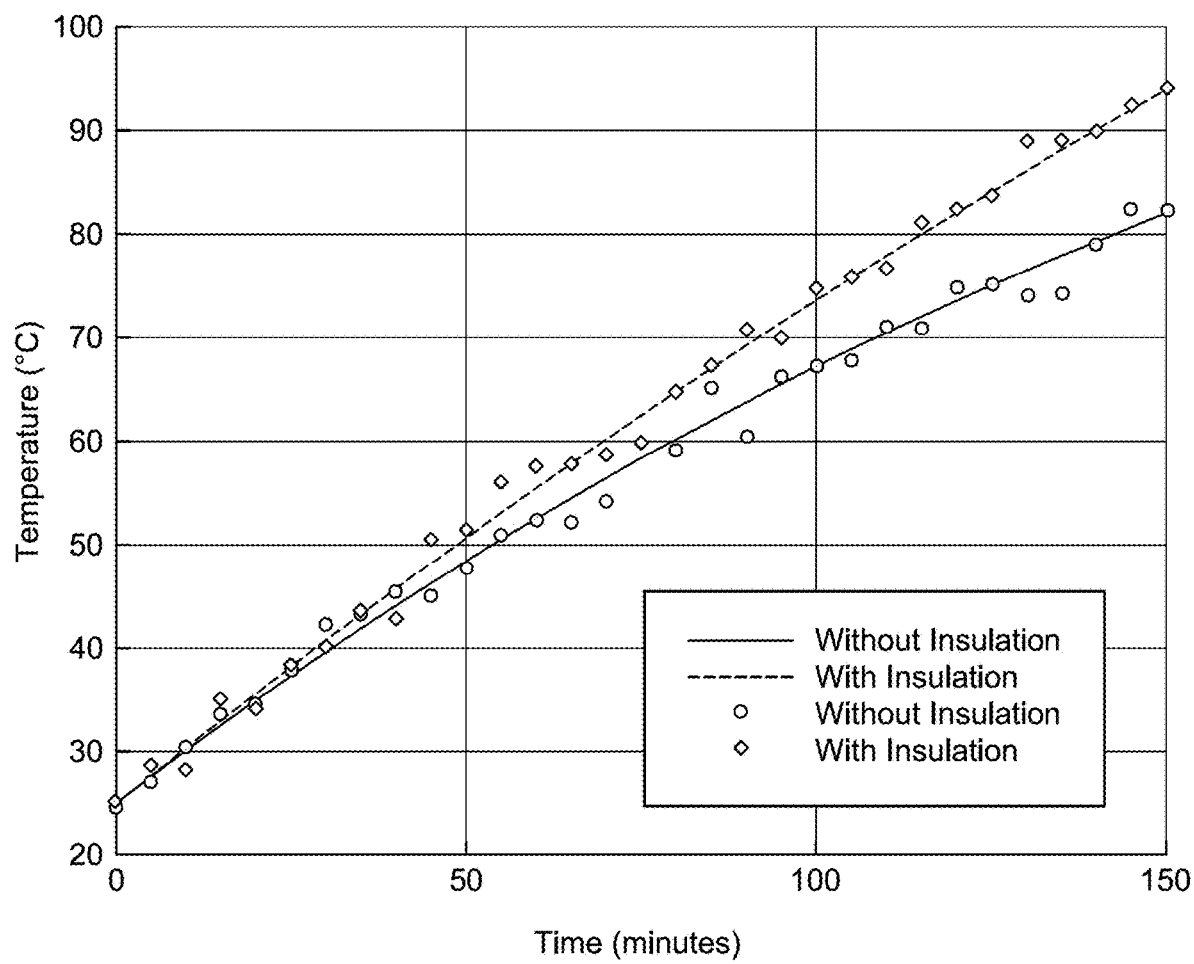
FIG. 6 is an exemplary graph showing experimental temperature rise over time for water heating with and without thermal insulation as per test results of the water heating system, according to certain embodiments.

Experimental measurements of water temperature versus time were recorded and plotted as shown in FIG. 6, comparing temperature rise characteristics with and without insulation of the water chamber 106. Herein, temperature rise over time for 5 liters of water heated using a 200 W PV source around noon, measured at 5-minute intervals, with and without insulation, has been plotted. The deviation from linearity in both curves reflects heat loss to the ambient environment in the laboratory. Using equation (2), a 68.5° C. increase in temperature was found after two hours if maximum power out of the PV source was obtained. This is almost same assuming ideal insulation is applied. The temperature measurements demonstrated alignment with theoretical predictions, confirming effective power transfer from the photovoltaic panel 102 to the reconfigurable heating circuit 110. The observed temperature plateau resulted from thermal losses to surrounding environment, with improved thermal performance observed with insulation.

Figure 7:
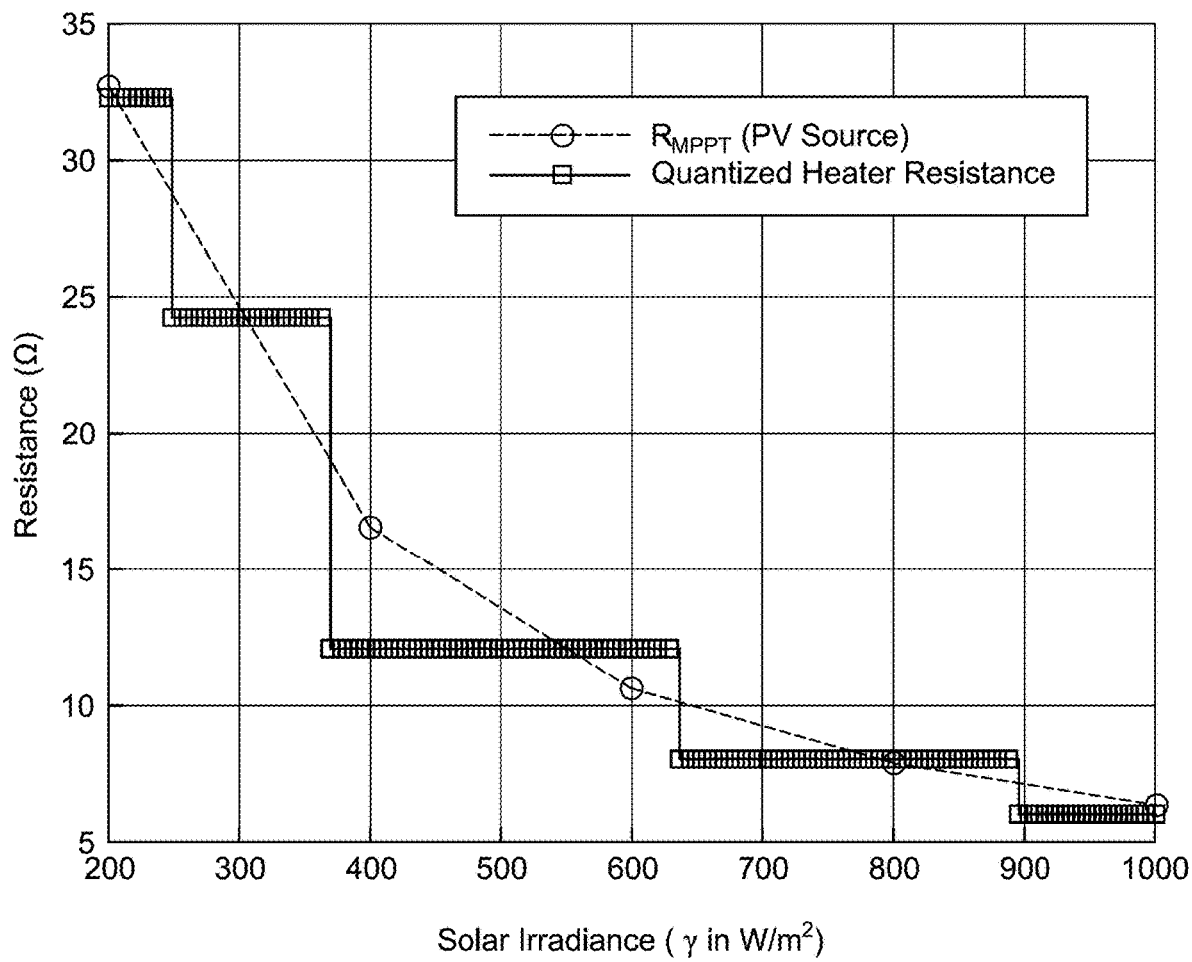
FIG. 7 is an exemplary graph comparing photovoltaic panel resistance at Maximum Power Point with quantized heater resistance values across varying solar radiation intensities as per test results of the water heating system, according to certain embodiments.

Further, the electrical characteristics of the photovoltaic panel 102 were measured across varying solar radiation conditions. The relationship between $R_{Mppt}$ and solar radiation intensity was determined from these measurements. FIG. 7 presents $R_{Mppt}$ variation with solar radiation (dashed curve) compared with discrete resistance values achievable through different configurations of the reconfigurable heating circuit 110 (stepped plot). The resistance values of the reconfigurable heating circuit 110 created quantized levels approximating the $R_{Mppt}$ curve of the photovoltaic panel 102. These discrete resistance levels enabled matching between the reconfigurable heating circuit 110 and the photovoltaic panel 102 across varying solar conditions. The testing demonstrated production capability of approximately 0.3 liters of processed water per hour through condensation after reaching boiling temperature.

The experimental validation demonstrated feasibility of the water heating system 100 for small-scale applications including drinking water production and household water processing in resource-limited environments. The testing confirmed capability for direct coupling between the photovoltaic panel 102 and the reconfigurable heating circuit 110 without power conversion equipment. The measured performance indicated scalability through incorporation of additional photovoltaic panels and corresponding heating elements.

Alternative configurations of the reconfigurable heating circuit 110 were evaluated using varied numbers of resistive heaters. Testing indicated that increased numbers of resistive heaters enabled finer approximation of the $R_{Mppt}$ curve, resulting in improved matching between the reconfigurable heating circuit 110 and the photovoltaic panel 102. The deviation between photovoltaic panel resistance and load resistance was further reduced through incorporation of additional direct current loads including the water pump 108.

The experimental results validated operation of the water heating system 100 without power conversion equipment while maintaining efficient power transfer through resistance matching. The testing demonstrated capability to achieve desired water heating performance using commercially available components in a simplified configuration. The measured thermal and electrical characteristics confirmed feasibility for implementation in remote and off-grid applications requiring water processing capability.

Table 1 below details how to vary the total resistance of a load composed of four heater elements by altering their connection configurations. The heaters can be connected in series, in parallel, and/or selectively disconnected, by adjusting the number of elements in each configuration. This reconfigurability allows for control of the total resistance to match the requirements of the system, such as adapting to changes in the resistance of a PV source under varying solar irradiance. Table 1 lists the resultant resistances for various configurations of four heaters. Each configuration is detailed in terms of the number of heaters connected in series and those connected in parallel. These configurations provide flexibility in adjusting the total resistance to closely match the desired PV resistance, thereby improving power transfer from the PV source to the heaters.

TABLE 1

Resultant Resistance of Heater Elements in Some Possible Configurations

| Number of Heaters in Series | Number of Heaters in Parallel | Total Resistance ($R_{total}$) (Ω) |
|---|---|---|
| 4 | 0 | $4 \times R_{heater} = 96.84$ |
| 0 | 4 | $\frac{R_{heater}}{4} = 6.05$ |
| 2 | 2 | $2 \times R_{heater} + \frac{R_{heater}}{2} = 60.5$ |
| 1 | 3 | $R_{heater} + \frac{R_{heater}}{3} = 32.27$ |
| 1 | 0 | $R_{heater} = 24.2$ |
| 0 | 2 | $\frac{R_{heater}}{2} = 12.1$ |
| 0 | 3 | $\frac{R_{heater}}{3} = 8.07$ |
| 2 | 0 | $2 \times R_{heater} = 48.4$ |
| 3 | 0 | $3 \times R_{heater} = 72.6$ |

The water heating system 100 can enable direct coupling between the photovoltaic panel 102 and the reconfigurable heating circuit 110 without requiring power conversion equipment. The light sensor 104 measures solar radiation intensity to enable the controller 120 to determine $R_{Mppt}$, while the plurality of switches 114 establish matching resistance values through reconfigurable connections of the one or more resistive heaters 112. The water heating system 100 achieves water heating and processing capabilities through simplified architecture that reduces component requirements while maintaining efficient power transfer from the photovoltaic panel 102.

The water heating system 100 reduces system complexity and maintenance requirements compared to conventional approaches that rely on power conversion equipment. The elimination of power converters decreases energy losses while enabling reliable operation in remote locations. The reconfigurable heating circuit 110 maintains desirable power transfer through direct resistance matching rather than electronic power conditioning, providing robust operation across varying environmental conditions. The modular design of the water heating system 100 enables scaling of capacity through addition of photovoltaic panels and corresponding components without increasing system complexity.

The water heating system 100 enables water processing applications in various settings. The water heating system 100 can be implemented to provide fresh water production capability for coastal communities without connection to electrical infrastructure. The water heating system 100 can be configured for emergency deployment to provide water processing capacity in disaster response scenarios. Additionally, the water heating system 100 can be utilized for supplying processed water for agricultural use in remote locations where conventional water sources are unavailable.

Figure 8:
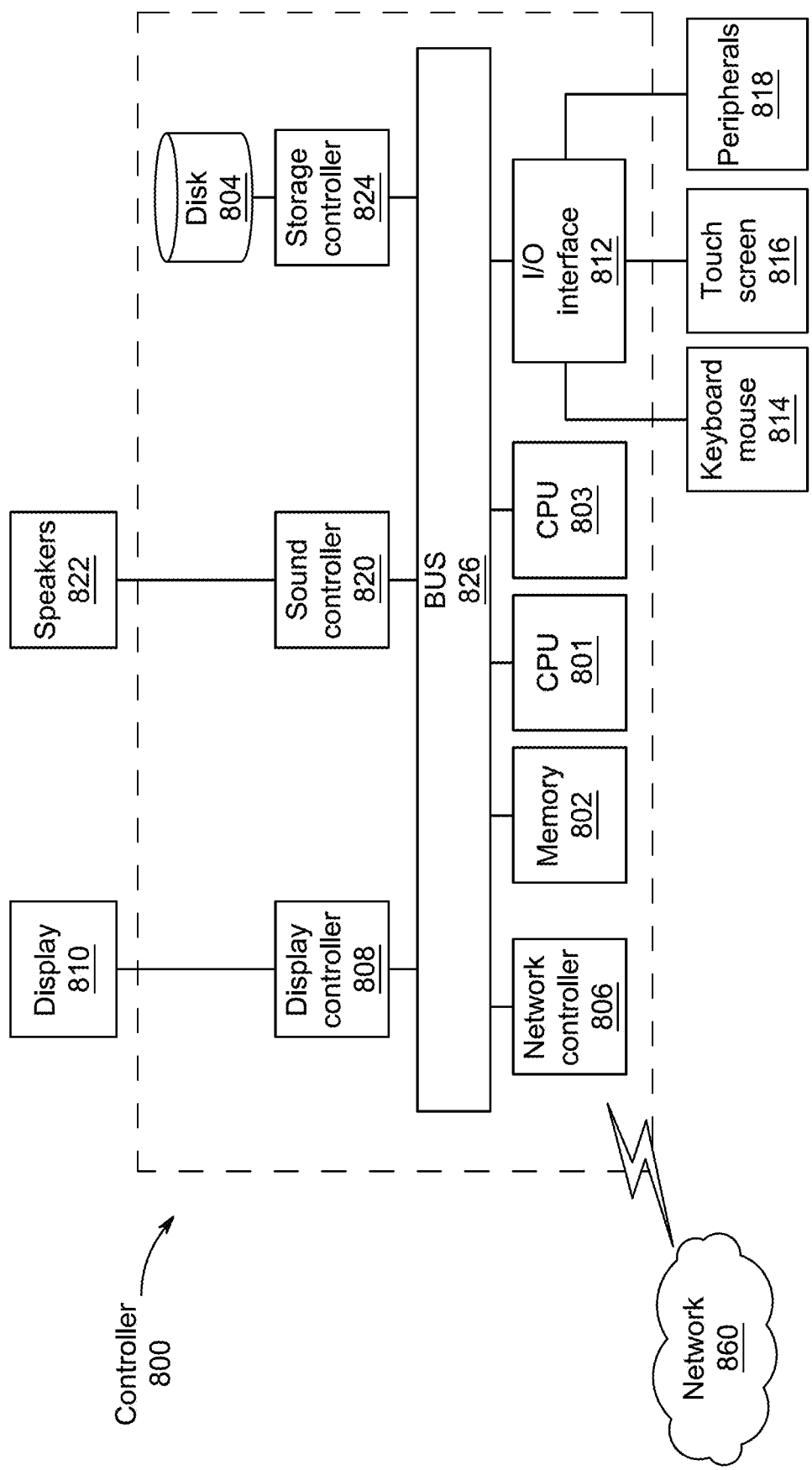
FIG. 8 is an illustration of a non-limiting example of details of computing hardware used in the computing system, according to certain embodiments.

Next, further details of the hardware description of a computing environment according to exemplary embodiments is described with reference to FIG. 8. In FIG. 8, a controller 800 is described is representative of the controller 120 of the present water heating system 100 to control operations of various electrical components therein, in which the controller 800 is a computing device which includes a CPU 801 which performs the processes described above/below. The process data and instructions may be stored in memory 802. These processes and instructions may also be stored on a storage medium disk 804 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 801, 803 and an operating system such as Microsoft Windows 7, Microsoft Windows 8, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 801 or CPU 803 may be a Xenon or Core processor from Intel of America or an Opteron processor from AMD of America, or may be other processor types that would be recognized by one of ordinary skill in the art. Alternatively, the CPU 801, 803 may be implemented on an FPGA, ASIC, PLD or using discrete logic circuits, as one of ordinary skill in the art would recognize. Further, CPU 801, 803 may be implemented as multiple processors cooperatively working in parallel to perform the instructions of the inventive processes described above.

The computing device in FIG. 8 also includes a network controller 806, such as an Intel Ethernet PRO network interface card from Intel Corporation of America, for interfacing with network 860. As can be appreciated, the network 860 can be a public network, such as the Internet, or a private network such as an LAN or WAN network, or any combination thereof and can also include PSTN or ISDN subnetworks. The network 860 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 808, such as a NVIDIA GeForce GTX or Quadro graphics adaptor from NVIDIA Corporation of America for interfacing with display 810, such as a Hewlett Packard HPL2445w LCD monitor. A general purpose I/O interface 812 interfaces with a keyboard and/or mouse 814 as well as a touch screen panel 816 on or separate from display 810. General purpose I/O interface also connects to a variety of peripherals 818 including printers and scanners, such as an OfficeJet or DeskJet from Hewlett Packard.

A sound controller 820 is also provided in the computing device such as Sound Blaster X-Fi Titanium from Creative, to interface with speakers/microphone 822 thereby providing sounds and/or music.

The general purpose storage controller 824 connects the storage medium disk 804 with communication bus 826, which may be an ISA, EISA, VESA, PCI, or similar, for interconnecting all of the components of the computing device. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 9.

Figure 9:
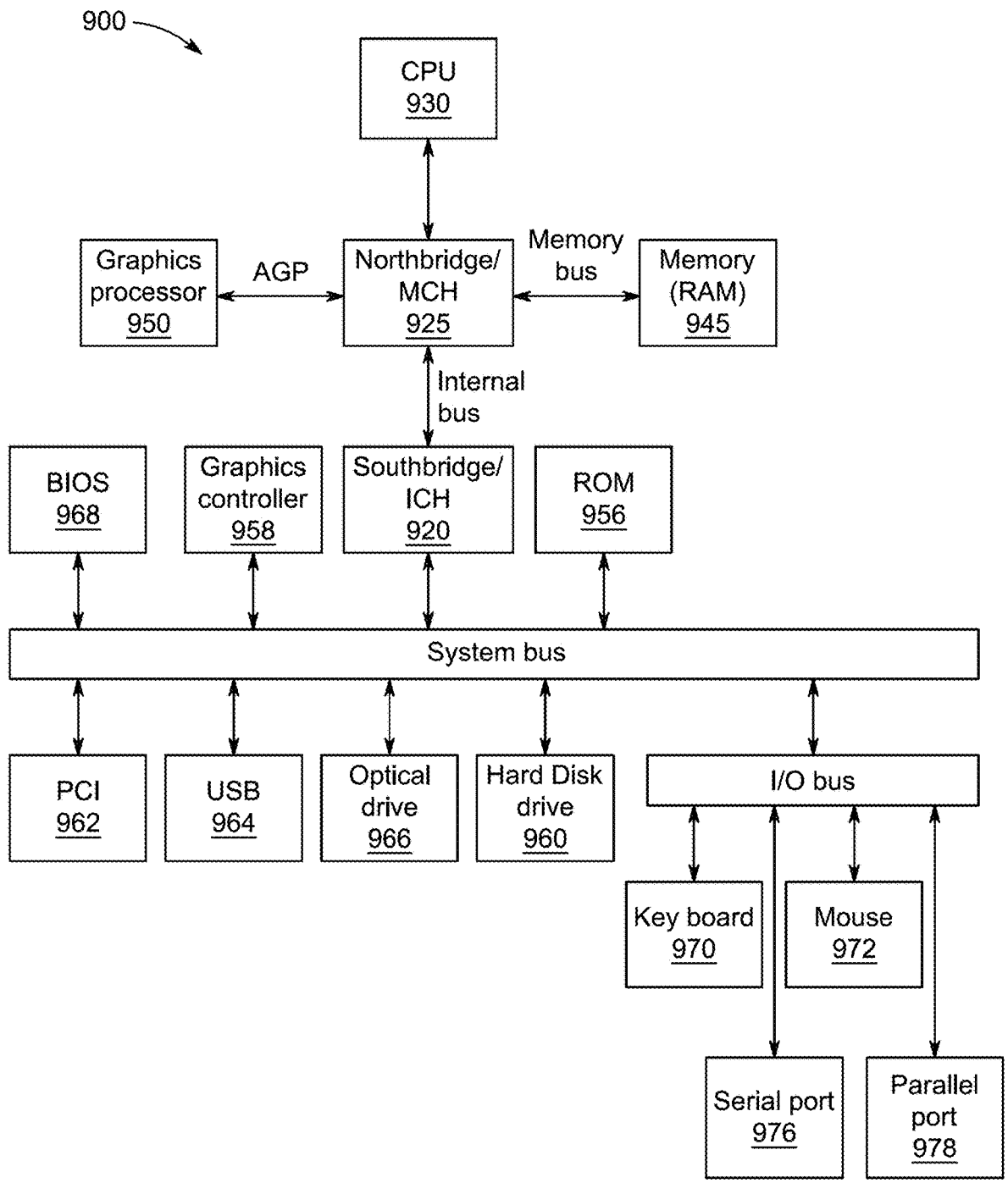
FIG. 9 is an exemplary schematic diagram of a data processing system used within the computing system, according to certain embodiments.

FIG. 9 shows a schematic diagram of a data processing system, according to certain embodiments, for performing the functions of the exemplary embodiments. The data processing system is an example of a computer in which code or instructions implementing the processes of the illustrative embodiments may be located.

In FIG. 9, data processing system 900 employs a hub architecture including a north bridge and memory controller hub (NB/MCH) 925 and a south bridge and input/output (I/O) controller hub (SB/ICH) 920. The central processing unit (CPU) 930 is connected to NB/MCH 925. The NB/MCH 925 also connects to the memory 945 via a memory bus, and connects to the graphics processor 950 via an accelerated graphics port (AGP). The NB/MCH 925 also connects to the SB/ICH 920 via an internal bus (e.g., a unified media interface or a direct media interface). The CPU Processing unit 930 may contain one or more processors and even may be implemented using one or more heterogeneous processor systems.

Figure 10:
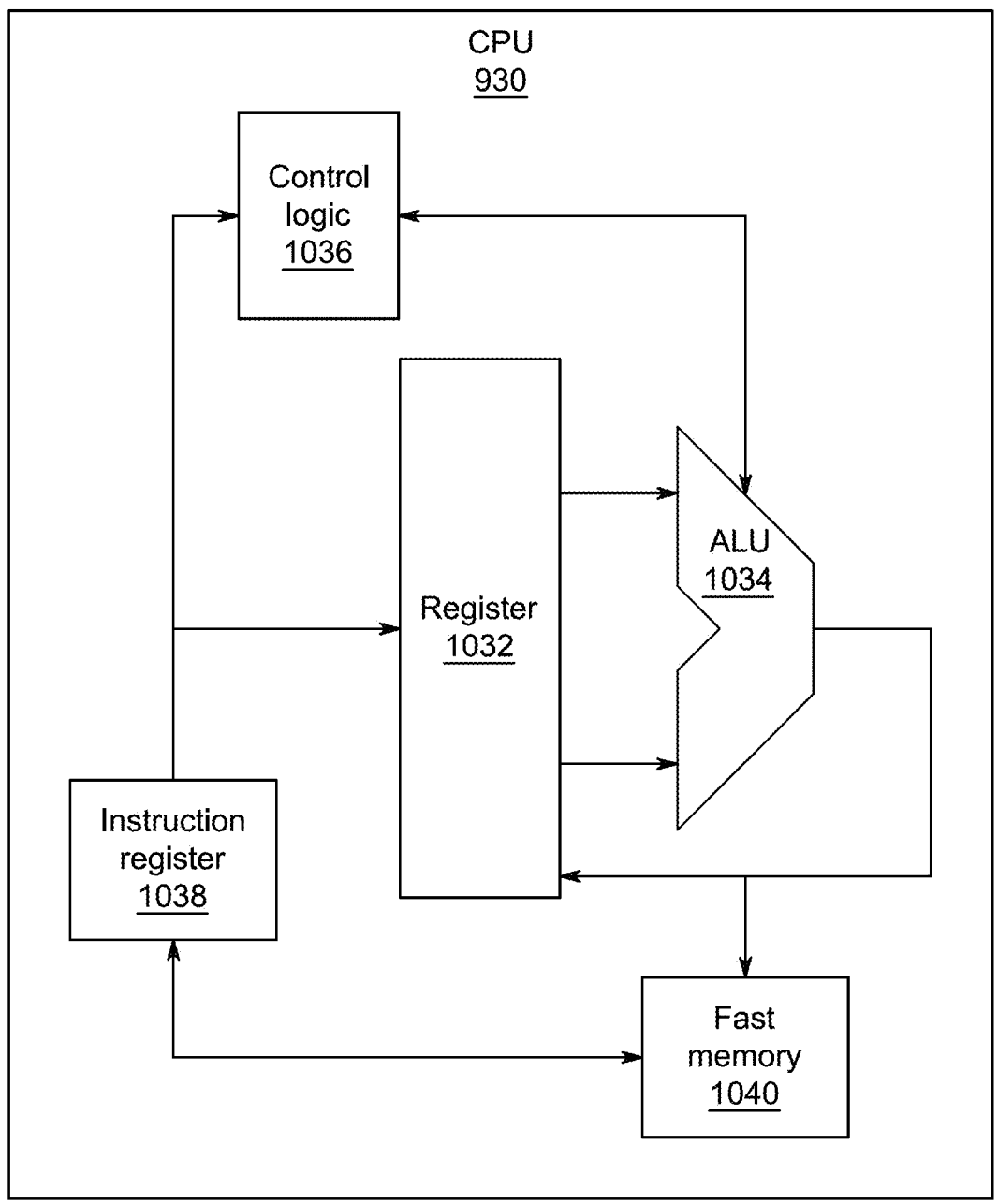
FIG. 10 is an exemplary schematic diagram of a processor used with the computing system, according to certain embodiments.

For example, FIG. 10 shows one implementation of CPU 930. In one implementation, the instruction register 1038 retrieves instructions from the fast memory 1040. At least part of these instructions are fetched from the instruction register 1038 by the control logic 1036 and interpreted according to the instruction set architecture of the CPU 930. Part of the instructions can also be directed to the register 1032. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1034 that loads values from the register 1032 and performs logical and mathematical operations on the loaded values according to the instructions. The results from these operations can be feedback into the register and/or stored in the fast memory 1040. According to certain implementations, the instruction set architecture of the CPU 930 can use a reduced instruction set architecture, a complex instruction set architecture, a vector processor architecture, a very large instruction word architecture. Furthermore, the CPU 930 can be based on the Von Neuman model or the Harvard model. The CPU 930 can be a digital signal processor, an FPGA, an ASIC, a PLA, a PLD, or a CPLD. Further, the CPU 930 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 9, the data processing system 900 can include that the SB/ICH 920 is coupled through a system bus to an I/O Bus, a read only memory (ROM) 956, universal serial bus (USB) port 964, a flash binary input/output system (BIOS) 968, and a graphics controller 958. PCI/PCIe devices can also be coupled to SB/ICH 988 through a PCI bus 962.

The PCI devices may include, for example, Ethernet adapters, add-in cards, and PC cards for notebook computers. The Hard disk drive 960 and CD-ROM 966 can use, for example, an integrated drive electronics (IDE) or serial advanced technology attachment (SATA) interface. In one implementation the I/O bus can include a super I/O (SIO) device.

Further, the hard disk drive (HDD) 960 and optical drive 966 can also be coupled to the SB/ICH 920 through a system bus. In one implementation, a keyboard 970, a mouse 972, a parallel port 978, and a serial port 976 can be connected to the system bus through the I/O bus. Other peripherals and devices that can be connected to the SB/ICH 920 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 11:
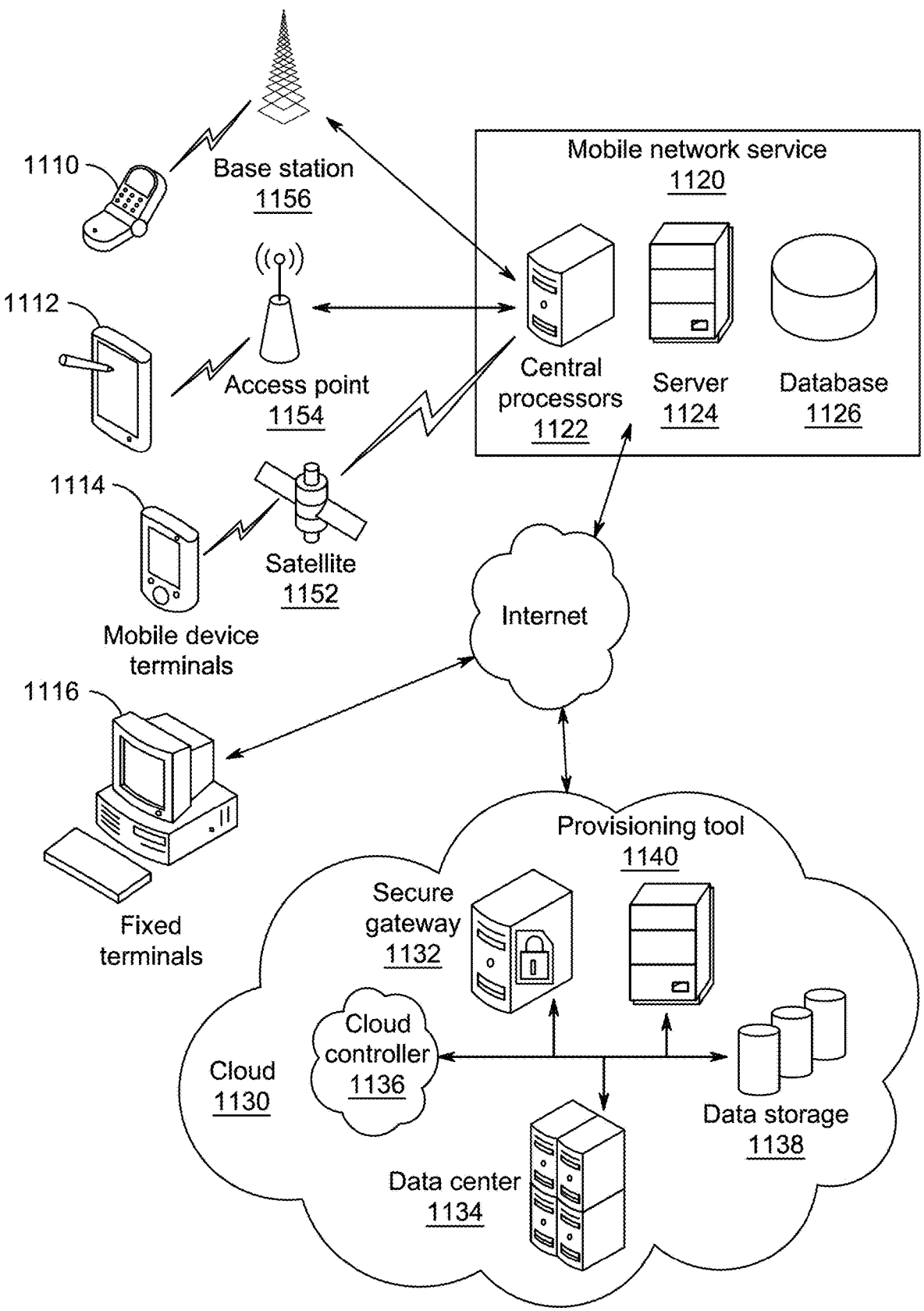
FIG. 11 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 1130 including a cloud controller 1136, a secure gateway 1132, a data center 1134, data storage 1138 and a provisioning tool 1140, and mobile network services 1120 including central processors 1122, a server 1124 and a database 1126, which may share processing, as shown by FIG. 11, in addition to various human interface and communication devices (e.g., display monitors 1116, smart phones 1110, tablets 1112, personal digital assistants (PDAs) 1114). The network may be a private network, such as a LAN, satellite 1152 or WAN 1154, or be a public network, may such as the Internet. Input to the system may be received via direct user input and received remotely either in real-time or as a batch process. Additionally, some implementations may be performed on modules or hardware not identical to those described. Accordingly, other implementations are within the scope that may be claimed.

While specific embodiments of the invention have been described, it should be understood that various modifications and alternatives may be implemented without departing from the spirit and scope of the invention. For example, different cellular automata rules or encryption algorithms could be employed, or alternative feature extraction and face recognition techniques could be integrated into the system.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:
1. A water heating system, comprising:
a photovoltaic (PV) panel configured to generate a direct current from sunlight;
a light sensor configured to measure a real-time radiation intensity of the sunlight;
a water chamber configured to receive water;
a reconfigurable heating circuit comprising four resistive heaters and nine switches and configured to heat the water in the water chamber; and
a controller configured to receive the real-time radiation intensity of the sunlight from the light sensor and adjust the nine switches in real time so as to match a total resistance of the reconfigurable heating circuit with $R_{Mppt}$ in real time at least before the water boils,
wherein $R_{Mppt}$ is a characteristic resistance of the PV panel at a Maximum Power Point (MPPT) at the real-time radiation intensity of the sunlight,
the controller is configured to adjust the total resistance of the reconfigurable heating circuit by individually turning on or off each of the nine switches to change the four resistive heaters from one connection state to another connection state,
connection states of the four resistive heaters include connection in series connection in parallel, and selective disconnection, and
the water chamber has a conical top on which are disposed a plurality of Fresnel lenses that are disposed around a circumference of the conical top as a belt at a height of the conical top.

2. The water heating system of claim 1, wherein:
the four resistive heaters include a first resistive heater, a second resistive heater, a third resistive heater, and a fourth resistive heater,
the nine switches include a first switch, a second switch, a third switch, a fourth switch, a fifth switch, a sixth switch, a seventh switch, an eighth switch and a ninth switch,
a first end of the first resistive heater is connected to a first end of the fourth switch, a first end of the fifth switch, and a first end of the sixth switch,
a second end of the first resistive heater is connected to a first end of the first switch, a first end of the seventh switch, a first end of the eighth switch, and a first end of the ninth switch,
a first end of the second resistive heater is connected to a second end of the first switch and a second end of the fourth switch,
a second end of the second resistive heater is connected to a first end of the second switch and a second end of the seventh switch,
a first end of the third resistive heater is connected to a second end of the second switch and a second end of the fifth switch,
a second end of the third resistive heater is connected to a first end of the third switch and a second end of the eighth switch,
a first end of the fourth resistive heater is connected to a second end of the third switch and a second end of the sixth switch,
a second end of the fourth resistive heater is connected to ground, and
a second end of the ninth switch is connected to ground.

3. The water heating system of claim 1, wherein:
the four resistive heaters are positioned inside the water chamber and configured to be immersed in the water, the reconfigurable heating circuit further comprises wiring structures and a switch board that is positioned outside the water chamber, and
the nine switches are positioned on the switch board and connected to respective ends of the four resistive heaters via the wiring structures.

4. The water heating system of claim 3, wherein:
the four resistive heaters are each coated with a thermally conductive and electrically insulating material.

5. The water heating system of claim 1, further comprising:
a temperature sensor positioned in the water chamber and configured to measure a real-time temperature of the water.

6. The water heating system of claim 5, further comprising:
a battery,
wherein the controller is configured to receive the real-time temperature from the temperature sensor and, when the real-time temperature reaches a boiling temperature of the water, divide the direct current into a first portion to be stored in the battery and a second portion to be delivered to the reconfigurable heating circuit and match a combined total resistance of the battery and the reconfigurable heating circuit with $R_{Mppt}$.

7. The water heating system of claim 1, wherein:
the PV panel is configured to supply the direct current directly to the reconfigurable heating circuit via no power converter.

8. The water heating system of claim 1, wherein:
the water heating system includes no power converter.

9. The water heating system of claim 1, wherein the controller is configured to:
store total resistance values of the reconfigurable heating circuit corresponding to the nine switches each independently being on or off,
choose one of the total resistance values that is the closet to $R_{Mppt}$ in real time, and
adjust the nine switches corresponding to the one of the total resistance values.

10. The water heating system of claim 1, further comprising:
a water pump configured to be powered by the PV panel and deliver the water to the water chamber.

11. The water heating system of claim 1, wherein:
the plurality of Fresnel lens are configured to focus sun rays and provide heat for the water chamber.

12. The water heating system of claim 1, wherein:
the water chamber is a desalination chamber, and
the water is saline water.

13. The water heating system of claim 12, further comprising:
a condenser configured to receive water vapors from the water chamber and condense the water vapors.

14. A method of water processing, comprising:
heating the water with the water heating system of claim 1.

15. The method of claim 14, further comprising:
generating the direct current from the sunlight with the PV panel;
measuring the real-time radiation intensity of the sunlight; and
adjusting the nine switches of the reconfigurable heating circuit in real time so as to match the total resistance of the reconfigurable heating circuit with $R_{Mppt}$ in real time at least before the water boils.

16. The method of claim 15, wherein:
the water is saline water, and
the heating comprises heating the saline water to at least a boiling point of the saline water to generate water vapors.

17. The method of claim 16, further comprising:
condensing the water vapors to generate fresh water.

* * * * *